United States Patent [19]

Baum et al.

[11] Patent Number: 5,867,478
[45] Date of Patent: Feb. 2, 1999

[54] SYNCHRONOUS COHERENT ORTHOGONAL FREQUENCY DIVISION MULTIPLEXING SYSTEM, METHOD, SOFTWARE AND DEVICE

[75] Inventors: Kevin Lynn Baum, Rolling Meadows; Nikhil Shashank Nadgauda, Chicago, both of Ill.

[73] Assignee: Motorola, Inc., Schaumburg, Ill.

[21] Appl. No.: 879,403

[22] Filed: Jun. 20, 1997

[51] Int. Cl.$^6$ .................................................. H04J 11/00

[52] U.S. Cl. .......................... 370/203; 370/208; 370/343; 370/480

[58] Field of Search ..................................... 370/203, 208, 370/210, 343, 480

[56] References Cited

FOREIGN PATENT DOCUMENTS

| 656 706 A2 | 6/1995 | European Pat. Off. . |
| 683 576 A1 | 11/1995 | European Pat. Off. . |
| 95-19671 | 7/1995 | WIPO . |

OTHER PUBLICATIONS

H. Nogami et al., "A Frequency and Timing Period Acquisition Technique for OFDM Sytems", Sixth IEEE International Symposium on Personal, Indoor and Mobile Radio Communications, (Cat. No. 95TH8135), vol. 3, pp. 1010–1015, Sep. 1995.

J. van de Beek et al., "Low–Complex Frame Synchronization in OFDM Systems", 1995 Fourth IEEE International Conference on Universal Personal Communications, (Cat. No. 95TH8128), pp. 982–986, Nov. 1995.

V. Mignone et al., "CD3–OFDM: A Novel Demodulation Scheme for Fixed and Mobile Receivers", IEEE Transactions on Communications, vol. 44, Iss. 9, pp. 1144–1151, Sep. 1996.

"An Analysis of Pilot Symbol Assisted Modulation for Rayleigh Fading Channels" by Cavers, James K., IEEE Transactions on Vehicular Technology, vol. 40, No. 4, Nov. 1991.

"Data Transmission by Frequency–Division Multiplexing Using the Discrete Fourier Transform" by Weinstein, S.B. and Ebert, Paul M.; IEEE Transactions of Communication Technology, vol. Com–19, No. 5, Oct. 1971.

"Multicarrier Transmission Technique in Cellular Mobile Communications Systems" by Reiners, C., and Rohling, H.; Conference paper, VTC 1994. 'Creating Tomorrow's Mobile Systems'. 1994 IEEE 44th Vehicular Technology Conference (Cat. No. 94CH3438–9) pp. 1645–1949 vol. 3.; IEEE, 1994 V. 3, p. 1882.

"A New System of Sound Broadcasting to Mobile Receivers" by Alard, M., Halbart, R. Le Floch, B.,and D. Pommier.; Conference paper, Eurocon 88: 8th European Conference on Electrotechnics. Conference Proceedings on Area Communication (Cat. No. 88CH2607–0) pp. 416–420 ; IEEE, 1980 p. 492.

(List continued on next page.)

Primary Examiner—Melvin Marcelo
Attorney, Agent, or Firm—Darleen J. Stockley

[57] ABSTRACT

A synchronous coherent orthogonal frequency division multiplexing, SC-OFDM, system, method, software and device include a plurality of SC-OFDM transmitters and a plurality of SC-OFDM receivers. Each of the plurality of SC-OFDM transmitters is synchronized to a reference where the reference is derived from a common source, for transmitting SC-OFDM signals. The plurality of SC-OFDM receivers is arranged to receive the SC-OFDM signals from at least one of the plurality of SC-OFDM transmitters. The SC-OFDM signals each have a cyclic extension, and the SC-OFDM signals from each SC-OFDM transmitter include at least one pilot code in accordance with a predetermined pilot code scheme.

77 Claims, 16 Drawing Sheets

OTHER PUBLICATIONS

"Digital Sound Broadcasting To Mobile Receivers" by Le Floch, B., Halbert–Lassalle, R., Castelain, D.; IEEE Transactions on Consumer Electronics vol; 35 Iss: 3 p. 493–503, Aug. 1989.

"Multicarrier Modulation for Data Transmission: An Idea Whose Time Has Come" by Bingham, John A.C. ; May 1990–IEEE Communications Magazine.

"An Overview of the Modulation and Channel Coding Schemes Developed for Digital Terrestrial Television Broadcasting withing the dTTb Project" by de Bot, Paul G.M., Bernard Le Floch, Vittoria Mignone, and Hans–Dieter Schutte; International Broadcasting Convention, 16–20 Sep. 1994 Conference Publication No. 397, IEE, 1994.

U.S. Patent Application Serial Number 08/829271, filed Mar. 31, 1997, Leo Dehner et al.

☒ PILOT CODE 1 ($W_1$)   ☒ PILOT CODE 3 ($W_3$)
☒ PILOT CODE 2 ($W_2$)   ☒ PILOT CODE 4 ($W_4$)

TIME (BAUD INTERVALS)

▨ BROADCAST INFORMATION FOR CELLS USING PILOT CODE 1 — 602
▨ BROADCAST INFORMATION FOR CELLS USING PILOT CODE 2 — 604
▩ BROADCAST INFORMATION FOR CELLS USING PILOT CODE 3 — 606
▦ BROADCAST INFORMATION FOR CELLS USING PILOT CODE 4 — 608

*FIG.6*    600

SYNCHRONOUS COHERENT ORTHOGONAL FREQUENCY DIVISION MULTIPLEXING SYSTEM, METHOD, SOFTWARE AND DEVICE

FIELD OF THE INVENTION

The present invention relates generally to orthogonal frequency division multiplexing (OFDM) wireless communication systems, and in particular, to reducing the impact of interference in OFDM wireless communication systems.

BACKGROUND OF THE INVENTION

Prior art OFDM systems use either differential modulation or pilot symbol based coherent modulation. With differential modulation, there is little need for the transmission of known, or pilot, symbols. The use of differential modulation reduces overhead but does not allow for measurement of the channel response, also referred to as the complex channel gain, of the desired signal.

Pilot symbol based coherent modulation enables the channel response of the desired signal to be measured. With pilot symbol based coherent modulation, known pilot symbols are periodically transmitted along with the data symbols. The pilot symbols are typically spaced in time and frequency according to the expected rate of channel variation in time and frequency, respectively. The receiver compares a received pilot symbol to the known transmitted pilot symbol value at each pilot symbol location to measure the channel response at the pilot symbol locations within the time-frequency grid. Filtering is then used to interpolate values of the channel response between pilot symbols and reduce the noise on the estimates. This information is used by the receiver in the coherent data symbol detection process.

However, a limitation of both differential modulation and pilot symbol coherent modulation is that neither provide the capability to individually measure the channel responses of co-channel interfering signals. This limitation could be detrimental in communication systems which re-use frequencies, such as cellular radio communication systems which employ cellular frequency re-use patterns.

DETAILED DESCRIPTION OF A PREFERRED EMBODIMENT

The present invention, termed Synchronous Coherent OFDM (SC-OFDM), provides an OFDM system which:

1. Provides a capability to measure the channel response of co-channel interfering signals in a receiver.
2. Provides for the suppression of co-channel interference in the measurement of the channel response of the desired signal in a receiver.
3. Provides the capability to receive co-channel interfering data symbols with no ISI or ICI in a receiver.
4. Provides for the suppression of co-channel interfering symbols on the received data symbols.

Figure 1:
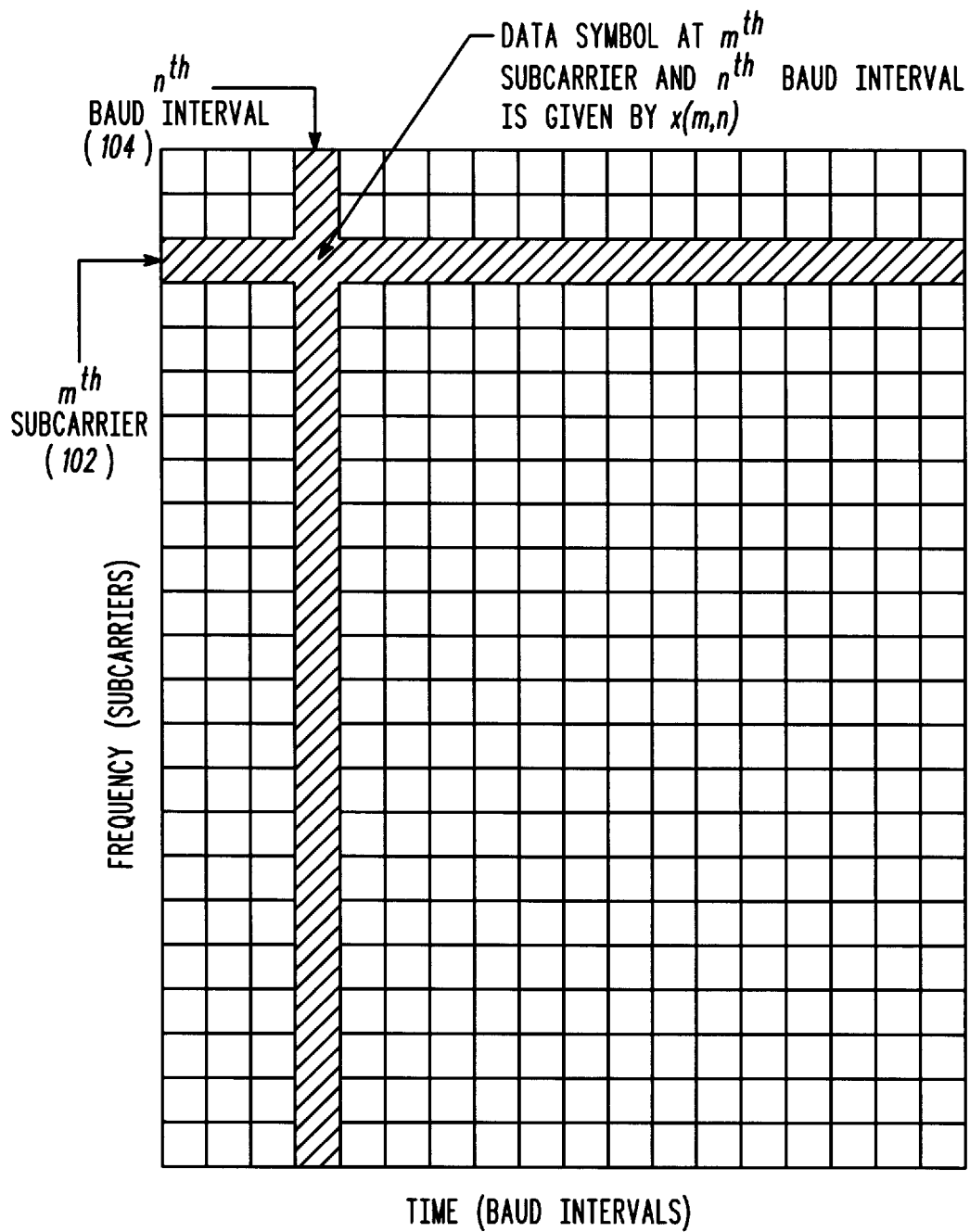
FIG. 1 is a graphical representation of the two-dimensional nature of an OFDM-based transmission scheme as is known in the art.

These aspects are described in more detail below after a general discussion of the characteristics of OFDM transmission schemes. Single carrier systems have a linear time-slot based transmission scheme, but OFDM offers the greater flexibility of a two-dimensional (time and frequency) transmission scheme. A slot in OFDM may contain both a plurality of symbols in time and a plurality of symbols in frequency. As a result, an OFDM slot may span a plurality of baud intervals and a plurality of subcarriers. FIG. 1, numeral 100, illustrates the two-dimensional nature of an OFDM based transmission scheme. Each small square represents a symbol. A single row (102) of the squares represents the symbols on a single subcarrier over several baud intervals or symbol intervals. Each column (104) of the squares represents the symbols in a single baud interval over several subcarriers. This two-dimensional representation may be referred to as a time-frequency grid. The symbol which is to be transmitted on the $m^{th}$ subcarrier during the $n^{th}$ baud interval will be denoted as x(m,n).

OFDM signal modulation or demodulation can be implemented with an inverse or forward Discrete Fourier Transform (DFT), respectively, as is known in the art. In order to efficiently generate a modulated OFDM signal in an OFDM transmitter, an inverse fast Fourier transform (IFFT) is commonly used. The IFFT is computed once every baud interval, with the IFFT output representing one column of the two-dimensional grid shown in FIG. 1.

Figure 2:
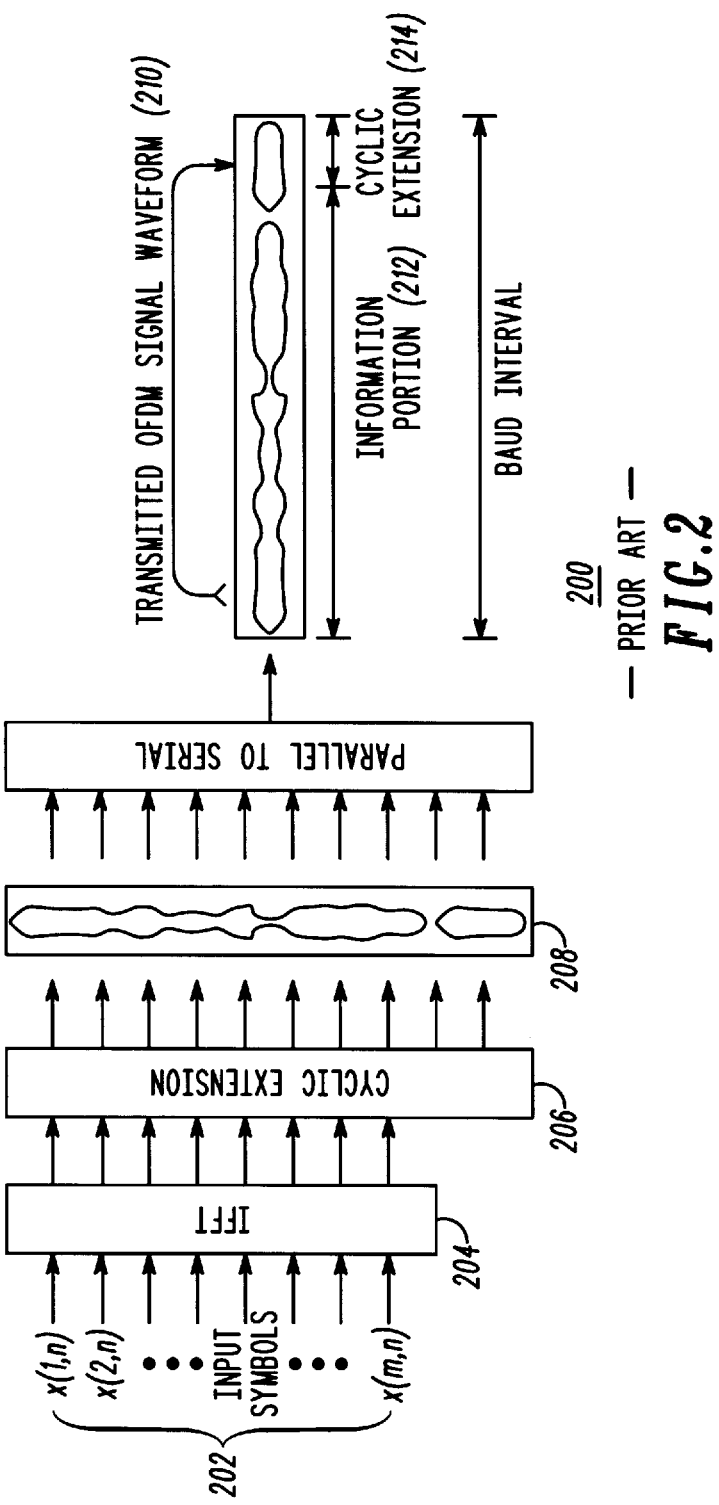
FIG. 2 is a graphical representation of an IFFT based OFDM modulator as is known in the art.

As illustrated in FIG. 2, numeral 200, an IFFT based OFDM modulator takes a group of symbols (202) corresponding to a single column of the above grid (i.e., symbols across multiple subcarriers, but within a single baud interval) as an input vector, computes an IFFT (204) of the input vector, then outputs the IFFT results as the OFDM signal waveform (210) (representing the symbols within one symbol (baud) interval). The OFDM modulator may also include a cyclic extension unit (206), which cyclically extends the output samples of the IFFT (208), as is known in the art. As is known in the art, the extension is used to eliminate inter-symbol interference (ISI) and inter subcarrier interference (ICI) due to multipath delay spread channels. To completely eliminate ISI and ICI, the cyclic extension duration must be greater than the duration of the channel impulse response.

A cyclically extended OFDM signal includes an information portion (212) and a cyclic extension portion (214), as is known in the art. The cyclic extension is a repetition of part of the information portion of the OFDM signal. A time interval which includes both the information portion and the cyclic extension portion is referred to as a baud interval. The information contained within a baud interval will be referred to as a baud or an OFDM baud. The signal waveform which represents the symbols in a baud interval can be referred to as an OFDM signal.

An OFDM receiver typically includes an FFT demodulator, which performs a frequency demultiplexing on a received OFDM signal to provide a demodulated symbol from each subcarrier for each baud interval. If the cyclic extension duration is greater than the duration of the channel impulse response, then the received symbols at the output of an FFT demodulator in a receiver can be modeled as $$y(m,n)=x(m,n)+z(m,n)$$

where x is the original transmitted symbol, typically from a symbol constellation such as QPSK or QAM, g is the channel response, and z includes noise and other signal distortions such as co-channel interference. All of these variables are typically complex valued. Following the FFT demodulation, a detector provides an estimate of one or more of the transmitted symbols. The detector may output hard decisions or soft decisions depending on needs of the application.

SC-OFDM is based on the combination of the following elements/requirements:

1. OFDM signal transmissions which are synchronized in time between co-channel transmitters.
2. A cyclic extension of sufficient length to absorb both delay spread and the propagation delay difference between co-channel transmitters and the receiver (e.g., inter-cell propagation delay).
3. Reference/pilot signals in the transmitted OFDM signals which are orthogonal between co-channel transmitters (e.g., between cells).
4. A common transmission format among co-channel transmitters.

If the first and second requirements are satisfied, then both the desired and co-channel interferer signal components can be received by an OFDM receiver without ISI and ICI. The first requirement insures that the OFDM symbol transmission time interval of co-channel interferers will coincide with the desired signal OFDM transmission time interval. With identical transmission time intervals, desired and co-channel signal components will be received with no ISI and ICI if the cyclic extension has sufficient length to absorb both delay spread and the propagation delay between co-channel transmitters.

If the desired and interfering signal components are received without ISI and ICI, it is possible to measure the channel response of each signal component in an SC-OFDM receiver if each signal contains an orthogonal reference signal, and if each reference signal is transmitted according to a common transmission format. By using an orthogonal pilot code scheme, as described later, among the co-channel transmitters, an SC-OFDM receiver can estimate the desired channel and co-channel interfering channel responses. As is known in the art, interpolation filtering can be used to estimate the channel response, also known as the complex channel gain, of the desired signal between the locations of the orthogonal reference signals. In contrast to the prior art, however, with SC-OFDM the channel response of the co-channel interferers can be interpolated in a similar way to the desired signal channel response. Knowledge of the channel response of the desired and co-channel interfering signals can then be used by the SC-OFDM receiver in a number of ways to improve performance or monitor channel conditions. The measurement of the channel responses of the desired and interfering signal components is also referred to as multi-channel channel response measurement. The combination of the desired and co-channel interfering signals received by a receiver from a plurality of transmitters will also be referred to as a composite received signal. The combination of the pilot codes received by a receiver from a plurality of co-channel transmitters will also be referred to as a composite pilot code.

Figure 14:
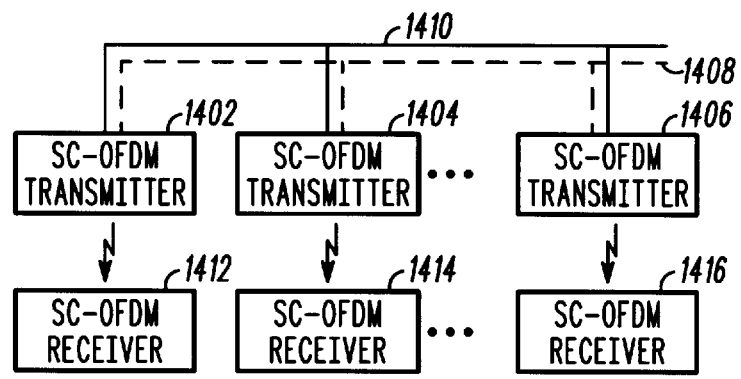
FIG. 14 is a block diagram of one embodiment of an SC-OFDM system in accordance with the present invention.

For downlink cellular applications, the first requirement can be satisfied by synchronizing base stations (SC-OFDM transmitters, 1402, 1404, . . . 1406) to a common time reference such as the global positioning system (GPS) (1408) or a common wireline (1410) network clock as shown in FIG. 14, numeral 1400. The second requirement can be satisfied by using either a large OFDM cyclic extension or small cells to minimize propagation delay. The third requirement can be satisfied by using pilot codes rather than individual pilot symbols in each OFDM slot for channel response estimation. A sequence length of N can provide N orthogonal pilot codes for inter-cell orthogonality. Note that the pilot codes not only enable the measurement of the channel response of co-channel interferers, but also virtually eliminate any co-channel interference from the channel response estimate of the desired signal.

With the three elements described above in place, the performance advantages of SC-OFDM are based on receiver processing in an SC-OFDM receiver (1412, 1414, . . . 1416) which:

1. Measures the channel response of the received desired signal and co-channel interfering signals. This is also referred to as multi-channel channel response measurement. Each of the desired signal and the co-channel interfering signals is also referred to as a component of a composite received signal.
2. Utilizes the multi-channel channel response measurements in a detector, where the detector preferably uses an interference mitigating detection method such as minimum mean square error (MMSE) adaptive antenna combining or joint detection. These methods are highly effective and have relatively low complexity in SC-OFDM because the interfering symbols are aligned with the desired symbols and the channel responses of interferers are measured individually. The detector provides an estimate of a transmitted symbol/bit in a hard decision format, a soft decision format, or the specific format that is preferred for subsequent processing, such as a decoding for an error correcting code.

Figure 3:
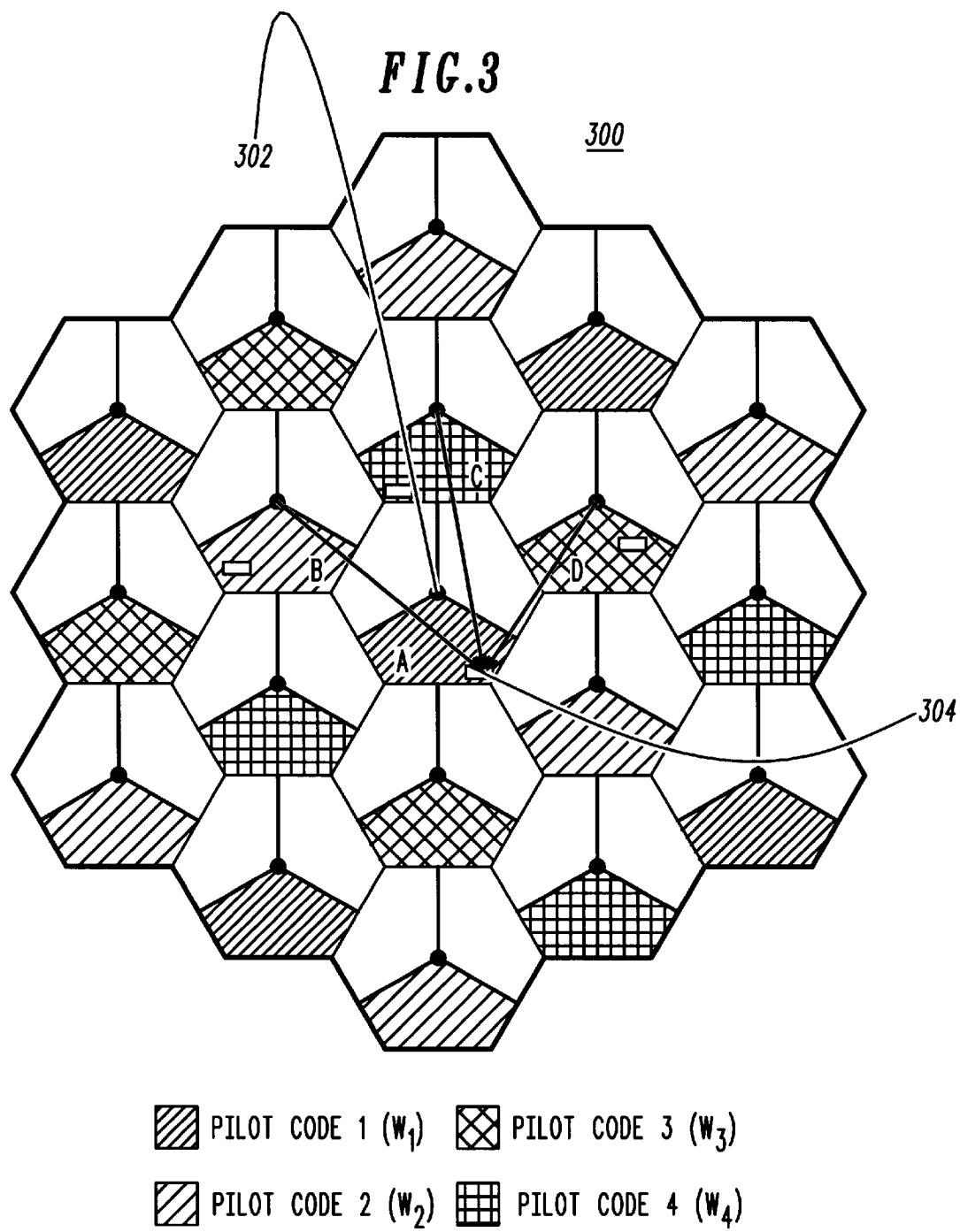
FIG. 3 is a graphic representation of a single cell re-use pattern with three sectors per cell and an associated pilot code re-use pattern in accordance with a preferred embodiment of the present invention.

In a preferred embodiment, a pilot code scheme includes a set of four orthogonal pilot codes, each of length N=4, to support the measurement of the channel responses of the desired signal and up to three co-channel interfering signals. A cellular re-use pattern in accordance with a preferred embodiment of the present invention is a single cell re-use pattern with three sectors per cell as shown in FIG. 3, numeral 300. A base unit (302) is located in the center of each cell, and subscriber units may be located anywhere in a cell. The transmission from a base unit to a subscriber unit is referred to as a downlink, while the transmission from a subscriber unit to a base unit is referred to as an uplink.

1. In the three sector, single cell reuse pattern, the available system bandwidth is divided into three groups, and the three groups are allocated to the three sectors of each cell. For the purpose of illustration, a subscriber unit, denoted as a small oval (304) in FIG. 3, is assumed to be located in the lower, shaded, sector of the center cell. This sector is labeled with the letter A. Subscriber units are also shown in the sectors labeled B, C, and D. The base unit in the center cell is assumed to be transmitting a desired signal to the subscriber unit in sector A using a 120 degree sectored antenna. The shaded sectors in the surrounding cells indicate the sectors which use the same frequency group as the sector containing the subscriber unit. These sectors may also be referred to as co-channel sectors, or co-channel sectors within co-channel cells. With the configuration shown in FIG. 1, and assuming that all base units are transmitting with 120 degree sectored antennas, there are three primary co-channel interfering signals from the base units in the first ring of the surrounding cells. The sources of co-channel interfering signals are the base units transmitting in the sectors labeled with the letters B, C, and D. The arrow-tipped lines from the base units transmitting in sectors A, B, C, and D to the subscriber unit in sector A indicate the signals received by the subscriber unit. As indicated, the subscriber unit receives a signal from the base unit transmitting in sector A, which is referred to as the desired signal. In addition to the desired signal, the subscriber unit in sector A also receives a co-channel interfering signal from each of the base units transmitting in sectors B, C, and D. The total received signal, which is the sum of the received signals from the desired and co-channel interfering base units, will be referred to as a composite received signal. Each of the desired signal and the co-channel interfering signals is also referred to as a component of the composite received signal.

The pilot code scheme preferably includes a pilot code allocation plan which is indicated in FIG. 3 by the shading pattern. The shaded sector of the center cell is allocated pilot code 1, and the primary interfering sectors of the surrounding cells are allocated the other three pilot codes, 2, 3, and 4. The pilot code scheme may also include pilot code re-use, as indicated in FIG. 3. Pilot codes can be re-used in sectors which are not in adjacent cells or are not pointing toward the subscriber unit. That is, pilot codes can be re-used in sectors which transmit away from the desired sector, and in the sectors which are in the second ring of co-channel cells. The pilot code re-use is possible because the signals originating in the sectors with re-used pilot codes are significantly attenuated when they reach the receiver in the sector of the center cell. The significant attenuation is due to either the large propagation distance or the sectored transmit antenna pattern. The re-use of pilot codes in this manner allows overhead to be reduced significantly since the pilot code length does not need to be as large as the number of cells in the system. Note that although the pilot code reuse pattern was shown only for one sector of each cell, a similar reuse pattern can be generated for the other sectors of the cells. In general, it is preferred that the pilot code re-use pattern is selected such that the potentially strongest co-channel interferers have different pilot codes than the desired signal, and this property is preferably satisfied in every sector of every cell within the SC-OFDM system.

Although the pilot code pattern was predetermined in this example, the pilot code re-use pattern can also be determined dynamically in an SC-OFDM system. Techniques in the art for performing dynamic channel allocation or the like can be applied to the allocation and dynamic management of pilot codes in an SC-OFDM system. This capability allows changes to the system, such as the addition of a new cell, to be handled in a flexible and efficient manner.

A pilot code is denoted as a vector $W_j$ where the elements, or symbols of the pilot code are denoted $w_{i,j}$. Thus, the $j^{th}$ pilot code of the N orthogonal pilot codes is written as $W_j=[w_{1,j}\ w_{2,j}\ \ldots\ w_{N,j}]^T$—where the superscript T denotes the vector transpose. The orthogonality of the pilot codes is assured by selecting the codes such that $$W_j^H W_k = 0 \text{ for } j \neq k,$$

where the superscript H denotes the Hermitian transpose. Examples of orthogonal pilot codes for N=4 are given in a later section of this document.

As described above, the preferred embodiment of the pilot code scheme uses pilot codes which are orthogonal. In an alternate embodiment, the pilot code scheme uses pilot codes that are not orthogonal, but have small cross correlation values. The cross correlation values are said to be small if they are smaller than the autocorrelation value of a pilot code by at least a predetermined amount. The predetermined amount is preferably several dB, such as 6 dB. A benefit of this alternate embodiment is that it may allow more than N pilot codes to be generated based a length N sequence. In another alternate embodiment, the pilot codes are not orthogonal, but have known cross correlation values. The known cross correlation values can be used in an SC-OFDM receiver to partially compensate for the known cross correlations in the estimation of the channel response of the desired and co-channel interfering signals. Like the previous alternate embodiment, a benefit of this alternate embodiment is that it may allow more than N pilot codes to be generated based a length N sequence. A drawback of these alternate embodiments is that the accuracy of the channel response measurements made in an SC-OFDM receiver will be lower than if orthogonal pilot codes are used.

In order to use SC-OFDM transmission from a base unit to a subscriber unit, the transmission times of the modulated OFDM signals in different cells must coincide. To satisfy this requirement, the base units can synchronize to a common time reference, such as a GPS signal or a wireline network clock. The frequency references of the base units must be virtually identical as well, but this requirement does not present an additional burden since base units typically use a high stability reference crystal. In addition, SC-OFDM transmitters preferably transmit with a common frame and slot format in each of the cells. Note that although a common frame and slot format is used, the contents of the slots and frames transmitted from different base units can vary. For example, different base units may transmit different pilot codes in a slot, or different reference signals during a synchronization signal portion of a frame. Also, the data in the slots transmitted by different base units is not related, which is a key distinguishing difference between the SC-OFDM system and paging or simulcast systems. SC-OFDM is used to increase spectrum efficiency and capacity, whereas simulcast is used to increase the area of service coverage.

SC-OFDM uses a cyclic extension in the OFDM modulator. A cyclic extension is normally used in OFDM systems to eliminate ISI and ICI due to multipath delay spread. Thus, in typical OFDM systems, the cyclic extension duration is selected to be as large as the expected channel impulse response duration or delay spread. In SC-OFDM, however, the cyclic extension is also used to enable the receiver to receive signals from nearby co-channel interferers without ISI and ICI. Therefore, in SC-OFDM, the cyclic extension duration is preferably selected to be as large as the sum of the base-to-base propagation delay between co-channel cells and the channel impulse response duration.

In an alternate embodiment, SC-OFDM is used within a single cell of a communication system. For example, a single cell can use the same frequency group in each sector. The re-use of the frequency group within each sector provides a higher spectrum efficiency within a cell. In this embodiment, each sector using the frequency group in the cell would be allocated a different pilot code from a set of orthogonal pilot codes. The transmitters for the different sectors can either be in a single base unit or a plurality of co-located base units. In another alternate embodiment, SC-OFDM is used within a single cell of a communication system by transmitting a plurality of SC-OFDM signals through a directional antenna system. Different SC-OFDM signals are transmitted in different directions by the directional antenna system, and each SC-OFDM signal has a different pilot code from a set of orthogonal pilot codes. Each of these alternate embodiments can use a single base unit which generates a plurality of OFDM signals simultaneously and transmits them with sectored, distributed, or an array of antennas. A benefit of these alternate embodiments is that they avoid the need to synchronize a plurality of base units to a common time reference.

A frame is a grouping of one or more OFDM symbol time intervals and one or more subcarrier locations. Note that an OFDM symbol time interval, also known as a baud interval, represents a number of symbols equal to the number of subcarriers in the OFDM modulator, as is known in the art. Frames are transmitted sequentially in time. Furthermore, within a frame, the OFDM signals are transmitted sequentially, one baud after another. The OFDM modulator generates one baud at a time, with the OFDM signal in one baud representing a number of symbols equal to the number of subcarriers in the OFDM modulator. That is, the OFDM modulator generates one column of modulated data per baud and transmits the bauds sequentially in time. A frame and slot formatter takes user data and other symbols and formats them into the predetermined slot and frame formats. The formatter then outputs the formatted symbols to the modulator in a format of one column per baud.

A majority of the symbols within a frame can be further grouped into a plurality of slots, where a slot is the minimum resource allocation unit for a user of the communication system. Like a frame, a slot is also a grouping of OFDM bauds and subcarrier locations. However, a slot contains a much smaller group of symbols than a frame, as is common in the art.

In addition to containing slots, a frame may also contain a grouping of one or more bauds and one or more subcarrier locations dedicated to the support of other system functions such as paging signals, broadcast signals, and synchronization signals.

In a preferred embodiment, the base units using SC-OFDM transmission transmit in accordance with a common frame format. A common frame format includes, but is not limited to, the same frame length, the same OFDM symbol duration, subcarrier spacing, slots of the same dimensions, slots in the same locations within a frame, and pilot codes in the same locations within a slot. However, different pilot codes are used in the sectors of closest co-channel cells to the extent of the number of available pilot codes. After the available pilot codes are exhausted, they are re-used according to a pilot code re-use plan, as was described earlier and shown in FIG. 3. In addition, use of portions of the frame such as the synchronization portion may be shared via time, frequency, or code division, or any combination thereof. The sharing is preferably coordinated in accordance with the pilot code reuse plan.

In an alternate embodiment, different frame formats can be used by different SC-OFDM transmitters in an SC-OFDM system as long as the pilot codes are co-located in the transmissions by different co-channel SC-OFDM transmitters. In preferred embodiment, a frame includes time and/or frequency regions for base units in the SC-OFDM system to transmit a synchronization or identification signal. This signal is a type of broadcast signal, and is preferably used to provide a known signal which the subscriber units can monitor to acquire and/or maintain timing and/or frequency synchronization. The frame region dedicated to this purpose is divided into preferably orthogonal regions via time, frequency, or code orthogonality, or some combination of these. Then each base unit is assigned one of the regions for transmitting its synchronization signal. The assignment to these regions is done in way that is preferably similar to the way the allocation of pilot codes was done for the base units. As a result of this scheme, a subscriber unit is able to measure the synchronization signal from the base unit in its own cell without the detrimental effects of strong co-channel interference. In addition, the subscriber unit is able to measure/monitor the synchronization signal from the dominant co-channel interfering sectors of the surrounding cells. This capability enables the subscriber unit to measure the relative propagation delay of the interfering signals, which directly affects the amount of phase change per subcarrier on the interfering signals after demodulation. The subcarrier phase difference information for an interfering signal can be accounted for in the detection algorithms in the receiver, as will be described later.

Figure 4:
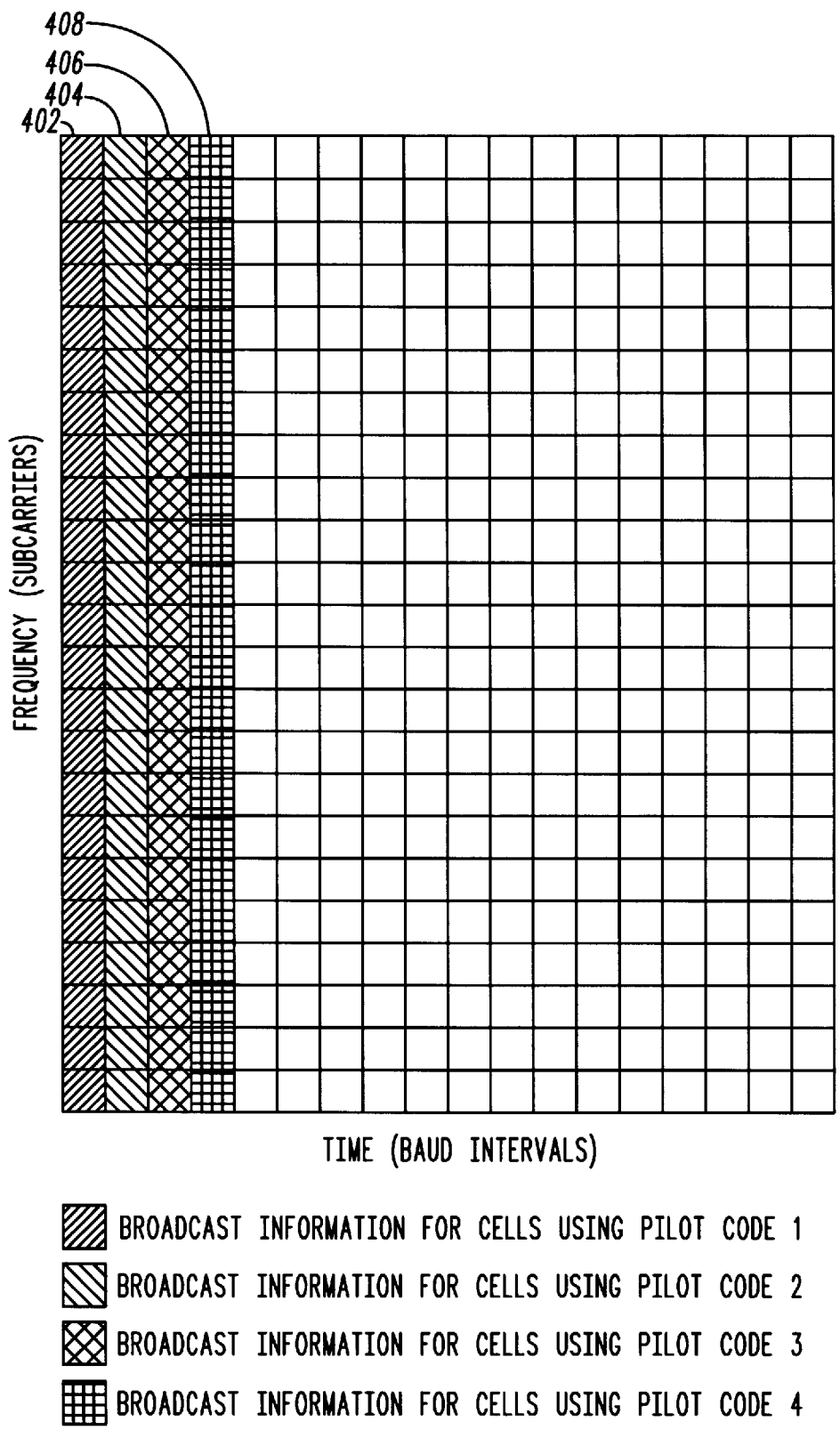
FIGS. 4–6 illustrate embodiments of schemes for coordinating the transmission of synchronization signals in a frame by a plurality of base units.
Figure 5:
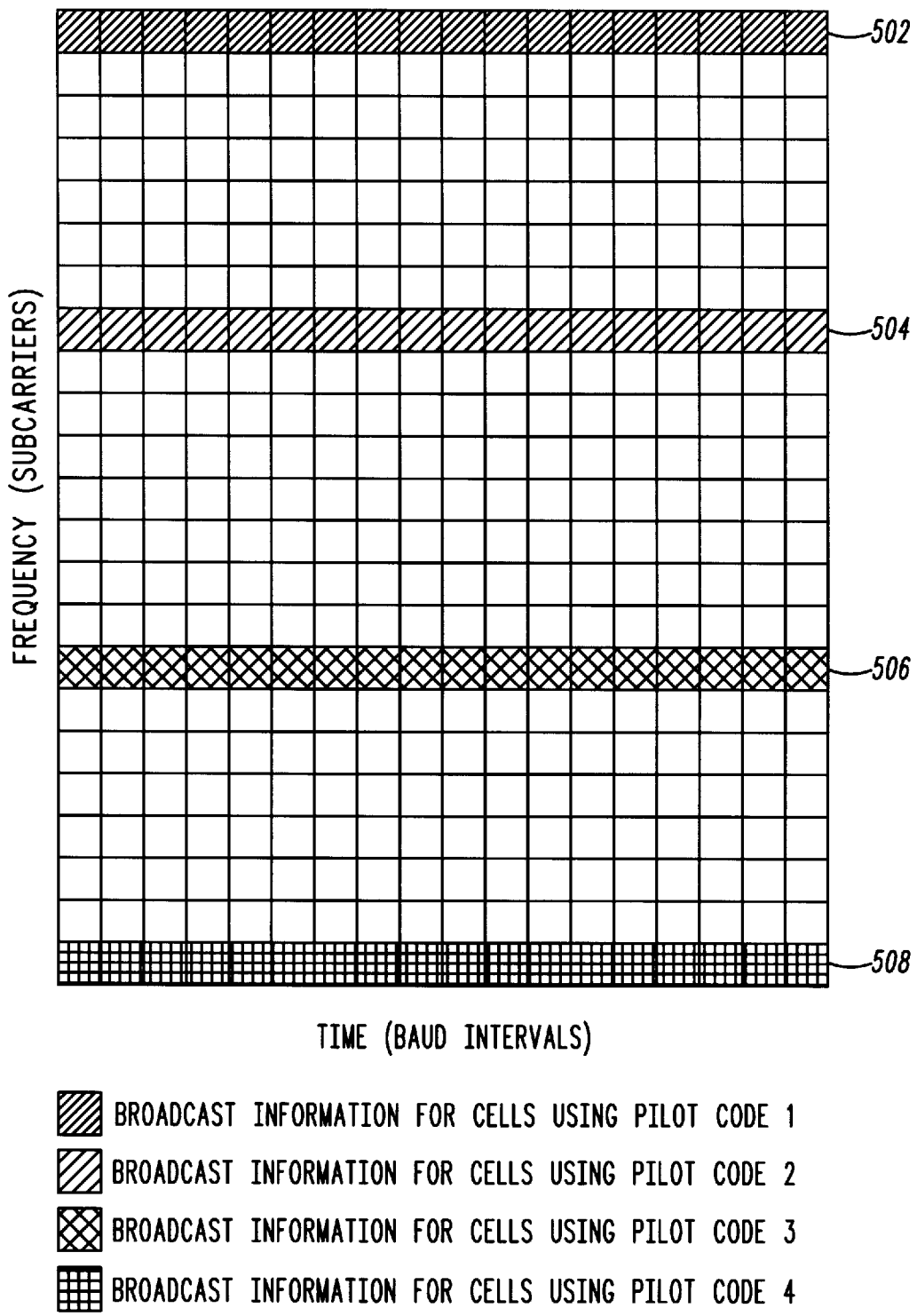
Figure 6:
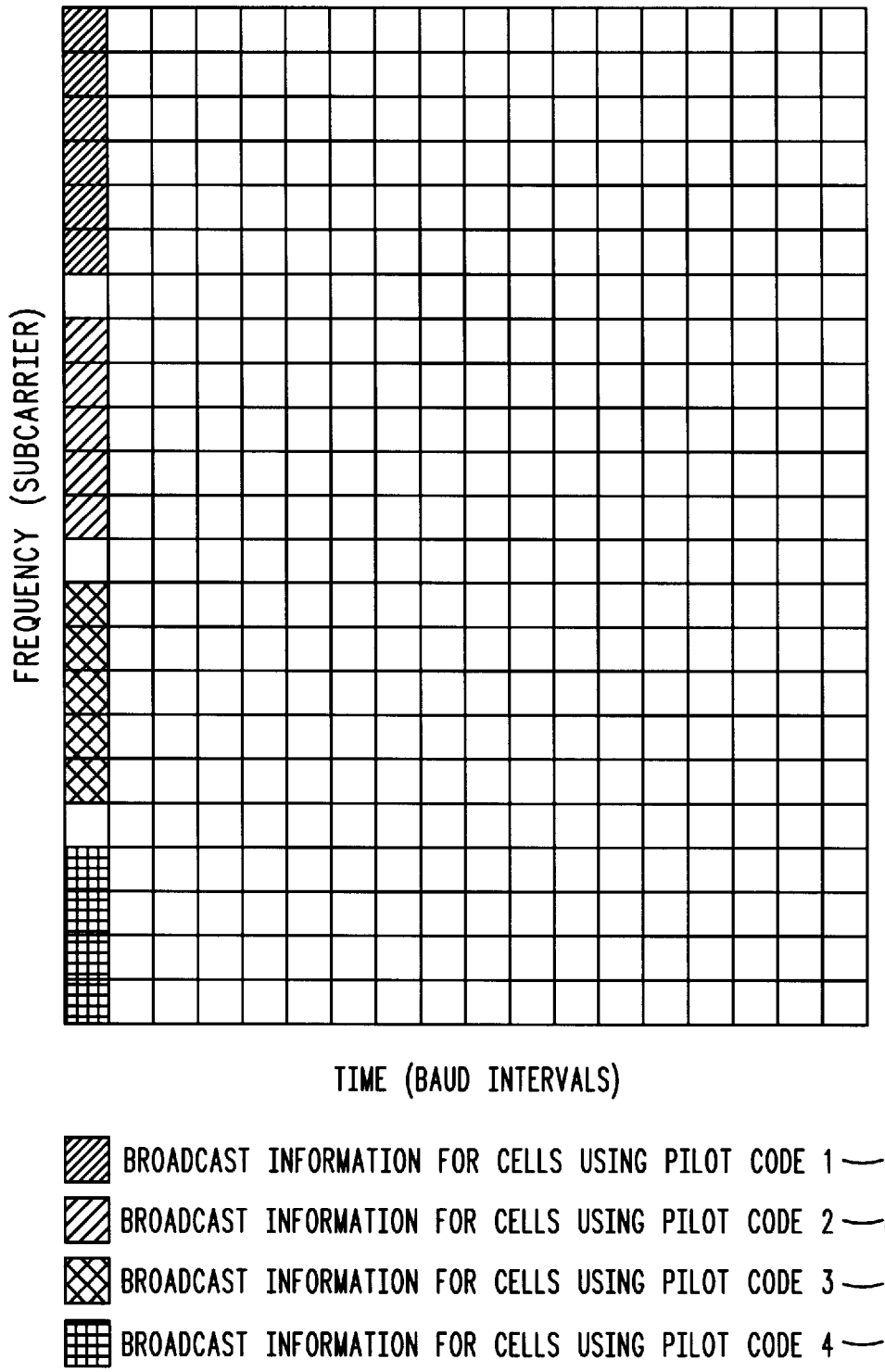

FIGS. 4–6, numerals 400, 500 and 600 respectively, indicate embodiments of schemes for coordinating the transmission of synchronization signals in a frame by a plurality of base units. In each case, the coordination is based in part on the pilot code scheme. FIG. 4, numeral 400, illustrates a preferred embodiment which includes four adjacent baud intervals (402, 404, 406, 408) in a frame for the transmission of synchronization signals. In this embodiment, a base unit which uses pilot code 1 transmits a synchronization signal during the first baud and null symbols (i.e., symbols with a constellation value of (0,0)) during the second, third and fourth bauds. Note that when an OFDM signal consists of null symbols on every subcarrier, the transmitted signal is zero, also referred to as a null baud, so there is no need to actually transmit during a null baud. A base unit which uses pilot code 2 transmits a synchronization signal during the second baud and null symbols (0) during the first, third, and fourth bauds. A base unit which uses pilot code 3 transmits a synchronization signal during the third baud and null symbols (0) during the first, second, and fourth bauds. A base unit which uses pilot code 4 transmits a synchronization signal during the fourth baud and null symbols (0) during the first, second, and third bauds. In this embodiment, the synchronization signal transmitted by a base unit is not required to be an OFDM signal. Any signal which is time-limited so as to fit in a baud duration and band-limited so as to fit in the frequency band spanned by the subcarriers can be used. Also, although the bauds for the transmission of synchronization signals are adjacent in this embodiment, these bauds are not required to be adjacent in general. According to this embodiment, the composite received signal for a receiver receiving during one of the four synchronization baud intervals includes null signals from three base units and a synchronization signal from one base unit.

FIG. 5, numeral 500, illustrates to an alternate embodiment of a scheme for coordinating the transmission of synchronization signals in a frame by a plurality of base units. In this embodiment, a set of 4 subcarriers (502, 504, 506, 508), as indicated by shading in the figure, are for the transmission of synchronization signals by a plurality of base units. In this embodiment, a base unit which uses pilot code 1 transmits synchronization symbols in the first shaded subcarrier and null symbols (0) in the second, third, and fourth shaded subcarriers. A base unit which uses pilot code 2 transmits synchronization symbols in the second shaded subcarrier and null symbols (0) in the first, third, and fourth shaded subcarriers. A base unit which uses pilot code 3 transmits synchronization symbols in the third shaded subcarrier and null symbols (0) in the first, second, and fourth shaded subcarriers. A base unit which uses pilot code 4 transmits synchronization symbols in the fourth shaded subcarrier and null symbols (0) in the first, second, and third shaded subcarriers.

FIG. 6, numeral 600, illustrates another alternate embodiment of a scheme for coordinating the transmission of synchronization signals in a frame by a plurality of base units. In this embodiment, the symbols, or subcarriers, within a single baud are divided into 4 groups (602, 604, 606, 608), as indicated by the 4 shaded areas of the first baud. These groups within the first baud are for the transmission of synchronization signals by a plurality of base units. Note that the unshaded symbols in the first baud are optional null symbols which may be used to provide frequency guard space between the groups. In this embodiment, a base unit which uses pilot code 1 transmits synchronization symbols in the first shaded group of subcarriers and null symbols (0) in the second, third, and fourth groups of shaded subcarriers. A base unit which uses pilot code 2 transmits synchronization symbols in the second shaded group of subcarriers and null symbols (0) in the first, third, and fourth groups of shaded subcarriers. A base unit which uses pilot code 3 transmits synchronization symbols in the third shaded group of subcarriers and null symbols (0) in the first, second, and fourth groups of shaded subcarriers. A base unit which uses pilot code 4 transmits synchronization symbols in the fourth shaded group of subcarriers and null symbols (0) in the first, second, and third groups of shaded subcarriers.

Each of these embodiments of a scheme for coordinating the transmission of synchronization signals in a frame by a plurality of base units avoids co-channel interference on the synchronization signal from base units which use different pilot codes. These embodiments can also be combined, as necessary, to coordinate a larger number of base unit synchronization signal transmissions. These embodiments can also be applied to coordinate the transmission of synchronization or other signals by a plurality of subscriber units.

Although the description of the embodiments was based on the coordination of the transmission of a synchronization signal by each base unit, the scheme is not limited to the this application. The coordination scheme is also directly applicable to the transmission of paging, system information, broadcast signals, or other information. Furthermore, although the description was given for the case of coordinating four transmissions, similar embodiments for larger or smaller numbers of transmissions are merely variations of the presented embodiments. The coordination scheme can also easily be extended to coordinate the transmission of synchronization signals over a plurality of frames. For example, a frame could include a single baud for the transmission of a synchronization signal, with the usage of the sync baud coordinated for four base units over four frames.

The symbols in a frame which are not used for the transmission of synchronization signals or other specialized purposes are grouped into a number of slots. A slot consists of a predetermined number of adjacent OFDM symbol time intervals and subcarriers. Slots contain one or more pilot codes according to the pilot code allocations to the cells, as described earlier. The pilot code scheme does not require the pilot codes to be the same in each transmitted slot as long as the base units in the SC-OFDM system step through the available pilot codes in a coordinated fashion so as to maintain the orthogonality and avoid code collisions. Likewise, in a transmitted slot with a plurality of pilot codes, different pilot codes can be used in each pilot code position as long as the pilot codes are selected in a coordinated fashion among the base units in the SC-OFDM system. This coordination or allocation can be treated as "code hopping", and any techniques known in the art for implementing orthogonal hopping patterns can be applied to the pilot code selection process as a part of the pilot code scheme. Another way to handle the use of different pilot codes in a single transmitter is to define a group of pilot code sets where a pilot code set includes a plurality of pilot codes in a predetermined order. An example of a pilot code set is $\{W_1\ W_2\ W_3\ W_4\}$. The group of pilot code sets are chosen such that the $n^{th}$ pilot code of any pilot code set which is a member of the group is orthogonal to the $n^{th}$ pilot code of the other code sets in the group. An example of a group of pilot code sets with this property is $\{W_1\ W_2\ W_3\ W_4\}, \{W_2\ W_3\ W_4\ W_1\}, \{W_3\ W_4\ W_1\ W_2\},\{W_4\ W_1\ W_2\ W_3\}$. The pilot code sets would be allocated to transmitters using a scheme which is essentially similar to the pilot code scheme.

A slot is intended to be the minimum unit which can be allocated to a user for a communication session. A slot contains at least one pilot code. A receiver correlates the received pilot code with the pilot code of the desired signal and with the pilot codes of the co-channel interfering signals in order to measure the channel response of the desired signal and the co-channel interfering signals. In a preferred embodiment, a slot contains a plurality of pilot codes to enable the use of interpolation filtering to follow variations in the channel conditions over the slot.

Figure 7:
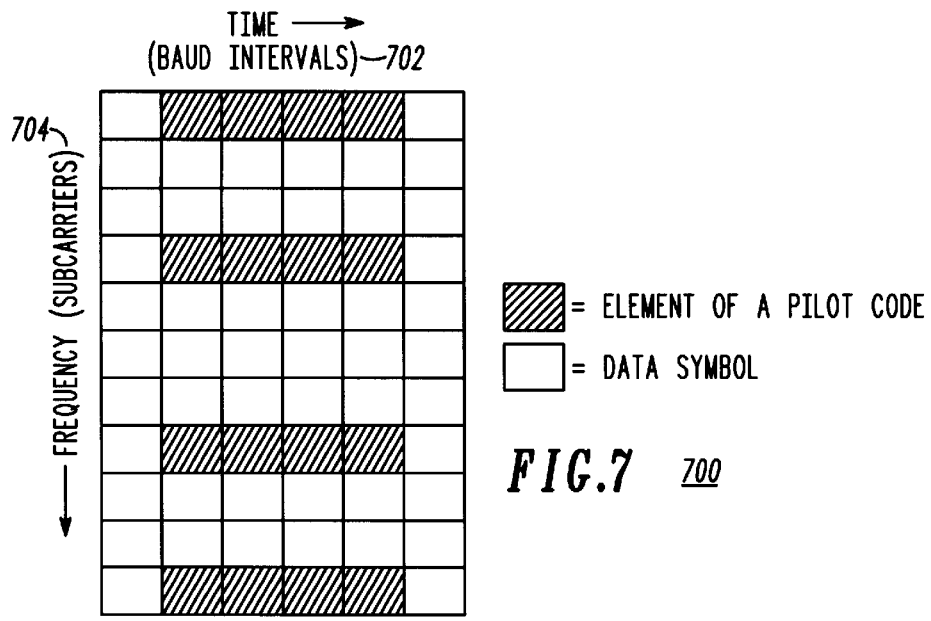
FIG. 7 is a graphical representation of a slot having 6 symbol intervals in time (6 bauds), and 11 subcarriers in frequency, containing a pilot code of length 4 on the first, fourth, eighth and eleventh subcarriers in accordance with a preferred embodiment of the present invention.

In a preferred embodiment, a slot consists of 6 symbol intervals in time (6 bauds) (702), and 11 subcarriers (704) in frequency as shown in FIG. 7, numeral 700. With this slot format, channel response estimates can be computed on the subcarriers containing a pilot code ($w_{1,j}$, $w_{2,j}$, $w_{3,j}$, $w_{4,j}$), and then interpolation filtering can be applied across the subcarriers. This slot format is best used in environments which are not expected to change significantly over the 6 baud duration of the slot.

Preferred OFDM parameters for an SC-OFDM system using this slot structure are as follows:

| Item | Value |
| --- | --- |
| Information Portion of OFDM Symbol | 80 μsec |
| Cyclic Extension Duration | 20 μsec |
| Total Baud Duration, Baud Rate | 100 μsec, 10 kbaud |

-continued

| Item | Value |
| --- | --- |
| Subcarrier Spacing | 12.5 kHz |
| Bandwidth per Sector | 5 MHz |
| Number of Carriers per Sector | 374 |
| FFT Size | 512 |
| Forward Error Correction | Rate ½ convolutional, 64 state (k = 7) |
| Cell Diameter | <1 mile |

As noted in the table, the SC-OFDM system preferably includes convolutional coding for error correction. Decoding is preferably implemented with soft decision decoding.

In a preferred embodiment, the pilot code consists of symbols from a constellation such as BPSK or QPSK. In an alternate embodiment, the pilot code includes constellation symbols and null symbols. When null symbols are included, it is preferred to increase the magnitude of the constellation symbols in the pilot code to maintain the same estimation accuracy in a noisy channel. An example of a set of orthogonal pilot codes using BPSK constellation points is:

$$W_1=\{1\ 1\ 1\ 1\}^T$$

$$W_2=\{1\ -1\ 1\ -1\}^T$$

$$W_3=\{1\ 1\ -1\ -1\}^T$$

$$W_4=\{1\ -1\ -1\ -1\}^T$$

where as defined earlier, $W_j=\{w_{1,j}\ W_{2,j}\ W_{3,j}\ W_{4,j}\}^T$

An example of a set of orthogonal pilot codes including null symbols and scaled BPSK constellation points is:

$$W_1=\{\sqrt{2}\ \sqrt{2}\ 0\ 0\}^T$$

$$W_2=\{\sqrt{2}\ -\sqrt{2}\ 0\ 0\}^T$$

$$W_3=\{0\ 0\ -\sqrt{2}\ -\sqrt{2}\}^T$$

$$W_4=\{0\ 0\ -\sqrt{2}\ -\sqrt{2}\}^T$$

With this set of pilot codes, the amplitude of the non-zero points was increased such that the total energy in the pilot code is the same as in the previous example.

In a preferred embodiment, a receiver receiving an SC-OFDM transmission measures the channel response of the desired signal at a pilot code location, that is, the group of symbol locations within a slot which encompass a pilot code, by cross correlating the received, demodulated signals at the pilot code location with a stored, known pilot code for the desired signal. The portion of the received signals containing a pilot code is also referred to as a composite pilot code because the received pilot code is actually the weighted sum of a plurality of pilot codes from a plurality of SC-OFDM transmitters, where the weights are the respective channel responses between each SC-OFDM transmitter and the given SC-OFDM receiver.

The cross correlation process is repeated for each pilot code location in a slot. Interpolation filtering is then applied to the channel response measurements to generate channel response estimates for each symbol location in the slot. In a similar way, the receiver also measures the channel response of a co-channel interfering signal at a pilot code location by cross correlating the composite pilot code with a stored pilot code which is different than the pilot code for the desired signal. Interpolation filtering is then applied to the interferer channel response measurements to generate interferer channel response estimates for each symbol location in the slot.

The interferer channel response measurement and interpolation filtering process is repeated for each pilot code in the orthogonal pilot code set which is not the pilot code of the desired signal. As noted earlier, the measurement of the channel response of signals from a plurality of transmitters is also called multi-channel channel response measurement.

Figure 8:
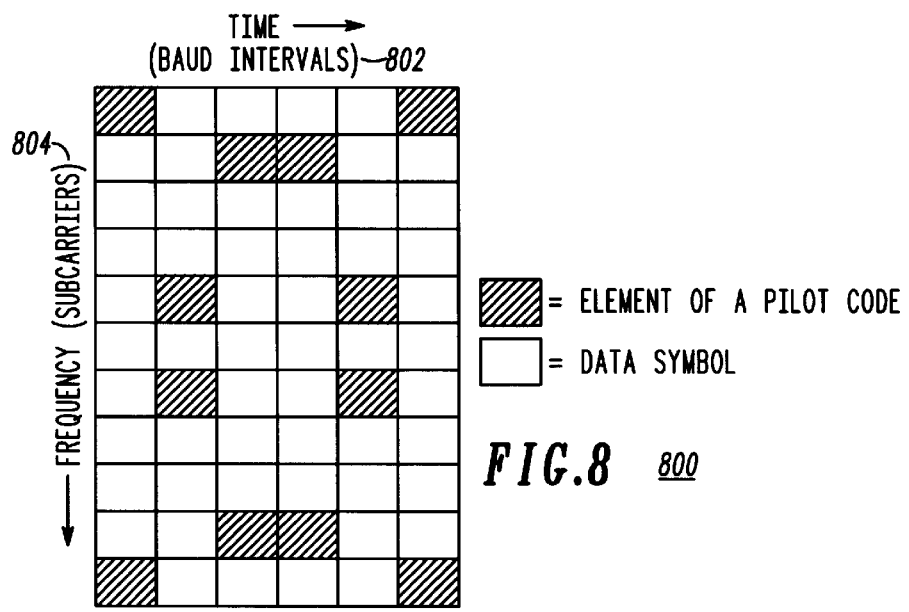
FIG. 8 is a graphical representation of an embodiment wherein symbols of a pilot code are dispersed in time and frequency within the slot.

In a preferred embodiment, the symbols characterizing a pilot code are placed in adjacent baud/symbol intervals and/or adjacent subcarriers within the slot. In an alternate embodiment, the symbols characterizing a pilot code are dispersed in time or frequency, or both, within the slot. An example using dispersed symbols is shown in FIG. 8, numeral 800. Two-dimensional (time and frequency) (802, 804) interpolation filtering can be used with this slot structure in order to track variations in the channel response in both time and frequency. However, if the channel variations are large, the orthogonality of the pilot codes will begin to degrade. As the orthogonality degrades, the accuracy of the channel response measurements will decrease accordingly.

Figure 9:
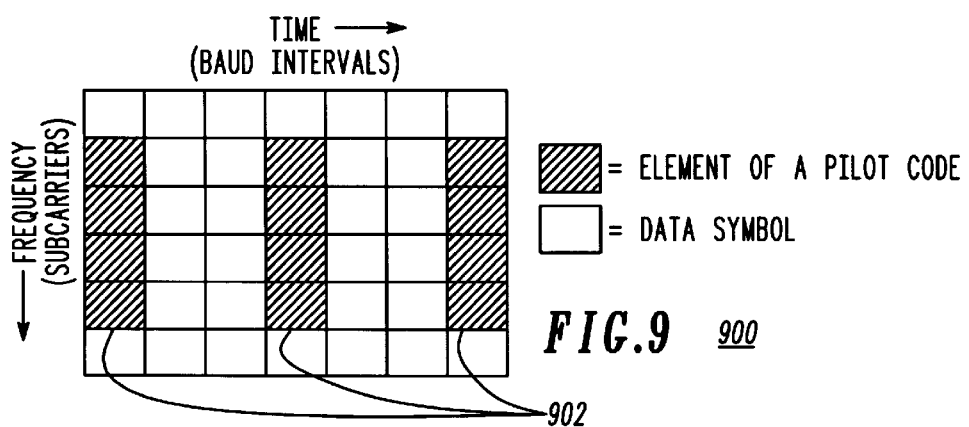
FIG. 9 is a graphical representation of an embodiment wherein symbols of a pilot code are placed within the same baud/symbol period on different subcarriers.

When propagation delay is a non-negligible fraction of the symbol duration (e.g.>1%), it is preferable to place the symbols of a pilot code on the same subcarrier, as was shown in the 11×6 slot structure. Otherwise, it is preferable to place the symbols of a pilot code within the same baud/symbol period on different subcarriers (902), as shown in FIG. 9, numeral 900.

Figure 10:
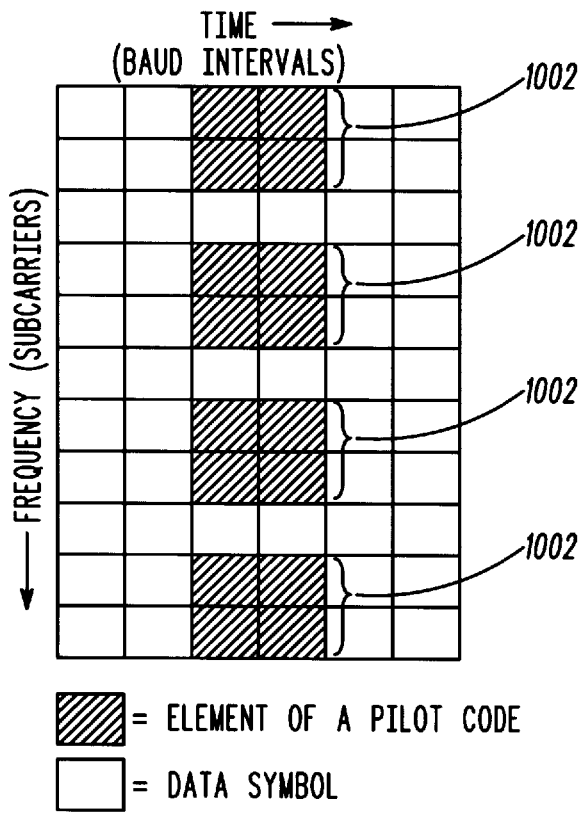
FIG. 10 is a graphical representation of an embodiment wherein symbols of a pilot code are placed in a combination of adjacent symbol periods and adjacent subcarriers.

An alternate embodiment places the symbols of a pilot code in a combination of multiple symbol periods and multiple subcarriers (1002), as shown in FIG. 10, numeral 1000.

Figure 11:
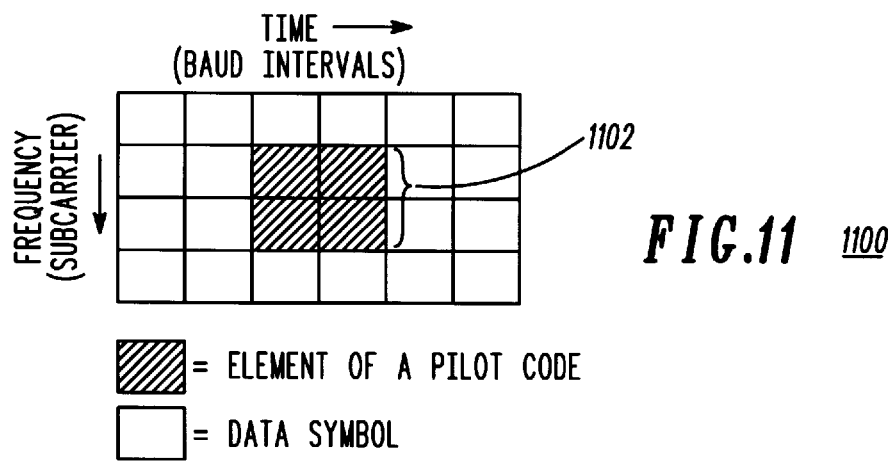
FIG. 11 is a graphical representation of an embodiment wherein only a single pilot code is placed in a slot.

Another alternate embodiment of a slot format places only a single pilot code in a slot (1102), as shown in FIG. 11, numeral 1100. This alternate slot format is useful when the channel response is not expected to change significantly over the slot. A benefit of this alternate slot format is that no interpolation filtering is needed, which leads to lower complexity in the receiver.

Different data rates are supported in the system by assigning different numbers of slots to a user. Multiple slots are allocated either in time, frequency, or both. The multiple slots do not need to be adjacent in time or frequency. It is preferable for the assigned slots to be separated in time and/or frequency in order to realize a time and frequency diversity effect, respectively. The maximum data rate is provided by assigning all slots to a single user. The data rate provided to a user can be different during different communication sessions, or may even vary during the same communication session.

In a preferred embodiment, the data symbols in a slot are based on a QPSK constellation, which represents two bits per data symbol. In another preferred embodiment, the data symbols in a slot are based on a constellation which provides the largest number of bits per symbol that can be used while still providing an adequate bit error rate (BER) performance. The criterion for adequate BER performance varies with the application. The constellation can change on a slot by slot basis to match the current channel conditions, or can be predetermined based on the expected co-channel interference levels.

In a preferred embodiment, only the slots which have been assigned to active users/subscriber units are modulated and transmitted. The benefit of this approach is that the amount of co-channel interference that is passed into the surrounding cells is minimized. This method is implemented by filling all slots or subcarriers which are not assigned with null symbols (i.e., symbols with a constellation value of (0,0)). In an alternate embodiment, the pilot codes in each slot are transmitted even when the slot is not assigned to a user. This method provides additional pilot codes outside the slots assigned to a particular user which can be used to increase the number of channel response measurements used in the channel response interpolation process.

Figure 12:
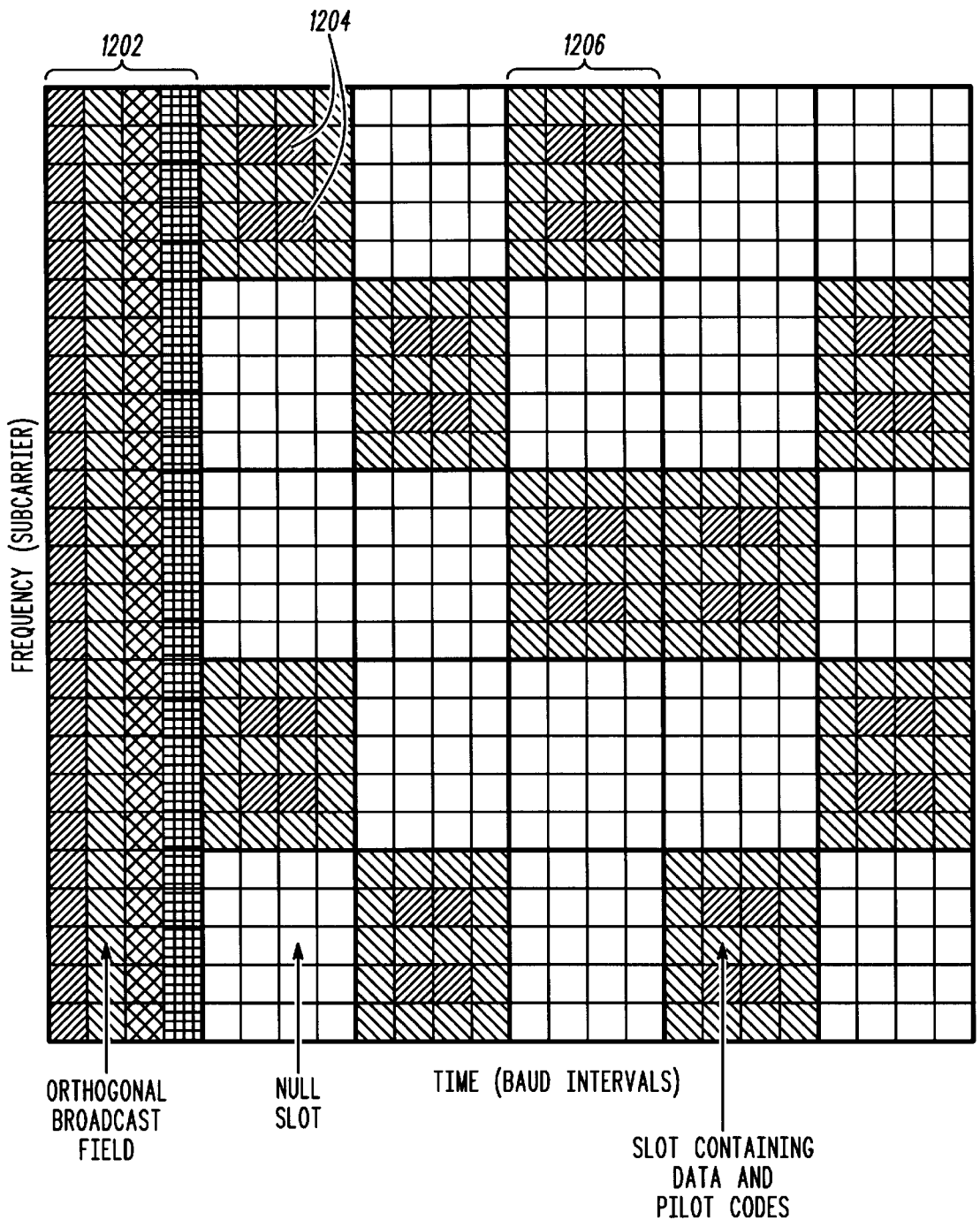
FIG. 12 shows an example of a frame which includes slots for data transmission and time regions for base units in the SC-OFDM system to transmit a synchronization signal in accordance with the present invention.

FIG. 12, numeral 1200, shows an example of a frame which includes slots for data transmission and time regions for base units in the SC-OFDM system to transmit a synchronization signal (1202). The frame includes four adjacent baud intervals at the beginning of the frame for the transmission of synchronization signals by a plurality of base units, as described earlier. The rest of the frame contains slots which may be assigned to carry data for users of the communication system. In this example, a slot (1206) spans four baud intervals and five subcarriers, as indicated by the bold lined boxes. Also, in this example a slot includes two pilot codes (1204), each of length two. This pilot code length is smaller than preferred, but it is used in this example for illustrative purposes. The frame contains 5 slots in the time dimension and 5 slots in the frequency dimension, for a total of 25 slots in a frame. Slots which are not shaded illustrate slots that are not allocated to a user. These slots are filled with null symbols, and can be viewed as not actually being transmitted.

The receiver can acquire initial synchronization to the system frequency and timing by searching for a signal having the properties of one of the synchronization signals transmitted by the base units. (examples include correlation, differential correlation). The synchronization signals from multiple base units can be monitored to determine the relative signal quality of the different base units. This information can then be used to determine which of the base units would provide the best signal quality, and which base unit t o communicate with in a communication session. During a communication session, the synchronization signals from the plurality of base units are preferably still monitored to enable the subscriber unit to monitor the overall signal quality, including signal power, interference power, C/I, C/N, etc. This information can be used in a number of ways to improve system quality and reliability, such as mobile assisted handoff.

Because of the interference channel response measurement capability inherent in SC-OFDM, interference suppression techniques can be used to improve the performance of SC-OFDM receivers compared to conventional OFDM receivers.

In the following description, it is assumed that the receiver is synchronized to the symbol timing and center frequency of the received signal. This can be accomplished using one of the OFDM synchronization algorithms known in the art. In addition, it is assumed that the received signal has been sampled and processed by an FFT demodulator to provide a baseband received signal with 1 complex sample per subcarrier per symbol interval, as is known in the art. The received signal is also referred to as a composite received signal in SC-OFDM, because the received signal consists of received signals from a plurality of SC-OFDM transmitters. An output of the FFT demodulator is also referred to as a composite symbol, because it encompasses a combination of transmitted symbols from a plurality of SC-OFDM transmitters. A composite symbol has a component from each of the plurality of SC-OFDM transmitters.

The baseband received composite signals are parsed into received slots consisting of pilot code portions and composite data portions according to the predetermined slot format. A pilot code portion includes the pilot symbol locations which encompass a composite pilot code. The pilot code portion is also referred to as a composite pilot code portion.

A multi-channel channel response estimator is used to estimate the channel response of signals from a plurality of SC-OFDM transmitters. To estimate the channel response of the desired signal, the SC-OFDM receiver correlates a composite pilot code portion of a received slot with a known, stored, pilot code for the desired signal. For example, a receiver in a sector which has been allocated pilot code 1 correlates a composite pilot code portion of the received slot with a locally stored copy of pilot code 1. If there are multiple pilot codes in a slot, the correlation is preferably performed for each composite pilot code portion of the received slot.

After obtaining desired signal channel response measurements for each composite pilot code portion of a slot, the channel response measurements are preferably filtered with an interpolation filter to provide desired signal channel response measurements for both pilot code portions and the data portions of the slot. This interpolation can also include desired signal channel response measurements from adjacent slots if the user is assigned a plurality of adjacent slots. In addition to correlating the composite pilot code portion of a received slot with the known pilot code of the desired signal, the composite pilot code portion of a received slot is also correlated with the pilot codes which are not assigned to the desired signal. In the preferred embodiment with 4 pilot codes and the desired signal having pilot code 1, the composite pilot code is correlated with a locally stored copy of pilot codes 2, 3, and 4. The result of these correlations provide channel response measurements for co-channel interfering signals using pilot codes 2, 3, and 4, respectively. If there are multiple pilot codes in a slot, the correlations are preferably repeated for each pilot code portion of the received slot.

After obtaining channel response measurements for each co-channel interfering signal at each pilot code portion of a slot, the channel response measurements for one the co-channel interfering signal are preferably filtered with an interpolation filter to provide co-channel interfering signal channel response measurements for both pilot code portions and the data portions of the slot. This interpolation filtering is preferably repeated for each of the co-channel interfering signal pilot codes to provide a set of interpolated co-channel interferer channel response measurements. In an alternate embodiment, if the magnitude of the measured channel response for a co-channel interfering signal is negligible, the channel response is not filtered with the interpolation filter in order to reduce processing complexity.

In a preferred embodiment, an SC-OFDM receiver unit with multiple antennas and receivers uses MMSE diversity combining to combine the signals received on each antenna. The impairments on the received SC-OFDM signal typically include multipath fading, additive white Gaussian noise (AWGN), and co-channel interference. The goal of MMSE diversity combining is to minimize the mean squared error between the combiner outputs and the symbols transmitted by the desired transmitter. To this extent, the signals from the multiple antennas are combined in such a way that desired components add constructively and/or interfering components add destructively. In the subsequent description, two branch diversity reception is assumed and the co-channel interference is modeled as SC-OFDM signals from a single co-channel SC-OFDM transmitter. This model was chosen to simplify notation and emphasize the essential aspects of MMSE diversity combining. It is straightforward to extend the model to include additional antenna branches and/or additional SC-OFDM co-channel interfering signals.

Assuming that the cyclic extension duration is larger than the combined delay spread and co-channel signal propagation delay, the two-branch received signal following the FFT demodulators in the receivers can be expressed as the following length-two vector:

$$\underline{y}(m,n) = \underline{g_1}(m,n)x_1(m,n) + \underline{g_2}(m,n)x_2(m,n) + \underline{v}(m,n)$$

$$= \begin{bmatrix} g_{1,1}(m,n) \\ g_{1,2}(m,n) \end{bmatrix} x_1(m,n) + \begin{bmatrix} g_{2,1}(m,n) \\ g_{2,2}(m,n) \end{bmatrix} x_2(m,n) + \begin{bmatrix} v_1(m,n) \\ v_2(m,n) \end{bmatrix}$$

In this case, m is the subcarrier index, n is the baud index, $x_1(m,n)$ is the data symbol originating from the desired transmitter, and $x_2(m,n)$ is the data symbol originating from the interfering transmitter. The Gaussian noise terms on the first and second diversity branches are given by $v_1(m,n)$ and $v_2(m,n)$, respectively, with $E[|v_1(m,n)|^2]=\sigma_1^2$, $E[|v_2(m,n)|^2]=\sigma_2^2$, and $E[v_1^{*(m,n)}v_2(m,n)]=0$. The instantaneous channel responses are modeled by $g_{k,p}(m,n)$, where k differentiates between the desired and interfering transmitters and p differentiates between the two diversity branches. In a preferred embodiment, $x_k(m,n)$ represents a QPSK data symbol having a unit power constellation ($|X_k(m,n)|^2 = 1$, $\forall m,n$, and k).

When MMSE diversity combining a set of received signals, the SC-OFDM receiver first forms a signal covariance matrix and signal steering vector based on the appropriate desired and interfering channel estimates. As discussed earlier, these estimates can be obtained from a multi-channel channel response measurement based on the desired and interfering transmitters' pilot codes.

In general, for the two antenna, single co-channel interferer scenario outlined above, the signal covariance matrix is given by $$\Phi(m,n) = E[\underline{y}(m,n)\underline{y}^H(m,n)]$$

The expectation can be approximated using a sample average over any amount of time over which the channel is constant, as is known in the art. The signal steering vector is given by $$\underline{s}(m,n) = E[\underline{y}(m,n)x_d^*(m,n)]$$

where $x_d(m,n)$ is a reference signal correlated with the desired data signal and uncorrelated with the interfering data signal. As with the signal covariance matrix, the expectation in the signal steering vector computation can be approximated using a sample average over any amount of time over which the channel is constant. Once the signal covariance matrix and steering vector have been computed, the optimal MMSE diversity combining weights are calculated as follows $$\underline{w}(m,n) = \frac{\Phi^{-1}(m,n)\underline{s}(m,n)}{\sigma_w^2(m,n)}$$

In a preferred embodiment, the denominator in the above equation, $\sigma_w^2(m,n)$, equals the mean squared error resulting from the combining process. Dividing by this term provides a channel quality weighting, facilitating soft decision decoding within the receiver. This term can be easily derived using the aforementioned pilot codes. In an alternate embodiment, the denominator in the above equation, $\sigma_w^2(m,n)$, equals another channel quality estimate designed to allow soft decision decoding and is also derived using the pilot codes. In another alternate embodiment, the denominator in the above equation, $\sigma_w^2(m,n)$, equals one.

These weights are then applied to the received signal vector to form an estimate of the desired transmitted signal as follows $$x_1(m,n) = \underline{w}^H(m,n)\underline{y}(m,n)$$

The rate at which the weights need to be recomputed depends on the rate at which the channel changes. In faster channels with higher Doppler rates, the weights need to be recomputed more often. Conversely, in slower channels with lower Doppler rates, the same weights can be used for longer periods of time.

An alternate embodiment of an SC-OFDM receiver unit with multiple antennas and receivers uses diversity combining with signal quality weighting. The impairments on the received SC-OFDM signal typically include multipath fading, additive white Gaussian noise (AWGN), and co-channel interference. In diversity combining with signal quality weighting, the diversity combining weights include information relating to both the noise power and the co-channel interference level. In the description given next, two branch diversity reception is assumed and the co-channel interference is modeled as SC-OFDM signals from a single co-channel SC-OFDM transmitter. This model was chosen to simplify notation and emphasize the essential aspects of the combining approach. However, it is straightforward to extend the model to include additional antenna branches and multiple SC-OFDM co-channel interferers.

Assuming that the cyclic extension duration is larger than the combined delay spread and co-channel signal propagation delay, the two-branch received signal following the FFT demodulators in the receivers can be expressed as the following length-two vector:

$$\underline{y}(m,n) = \underline{g}_1(m,n)x_1(m,n) + \underline{g}_2(m,n)x_2(m,n) + \underline{v}(m,n)$$

$$= \begin{bmatrix} g_{1,1}(m,n) \\ g_{1,2}(m,n) \end{bmatrix} x_1(m,n) + \begin{bmatrix} g_{2,1}(m,n) \\ g_{2,2}(m,n) \end{bmatrix} x_2(m,n) + \begin{bmatrix} v_1(m,n) \\ v_2(m,n) \end{bmatrix}$$

In this case, m is the subcarrier index, n is the baud index, $x_1(m,n)$ is the desired data symbol originating from the desired transmitter, $x_2(m,n)$ is the interfering data symbol originating from the interfering transmitter, $v_1(m,n)$ and $v_2(m,n)$ are the Gaussian noise on each diversity branch, with $E[|v_1(m,n)|^2] = \sigma_1^2$, $E[|v_2(m,n)|^2] = \sigma_2^2$, and $E[v_1^*(m,n) v_2(m,n)] = 0$. Moreover, the channel responses are modeled by $g_{k,p}(m,n)$, where k differentiates between the desired and interfering transmitters and p differentiates between the two diversity branches. In a preferred embodiment, $x_k(m,n)$ represents a QPSK data symbol having a unit power constellation ($|X_k(m,n)|^2 = 1$, $\forall m, n,$ and k). When diversity combining the received QPSK signals with signal quality weighting, the demodulated sample from each antenna is first multiplied by the conjugate of its corresponding estimated desired signal channel response, $g_{1,p}(m,n)$, and is then divided by an estimate of the instantaneous interference power plus noise power. As described earlier, the desired and co-channel interference estimates can be obtained from the pilot codes which are included in each slot. The noise power can be either be estimated or be known based on the noise figure of the receiver. Mathematically, if an estimated weight vector is defined as $$\underline{w}^H(m,n) = \begin{bmatrix} \dfrac{\hat{g}_{1,1}^*(m,n)}{\hat{\sigma}_{T_1}^2(m,n)} & \dfrac{\hat{g}_{1,2}^*(m,n)}{\hat{\sigma}_{T_2}^2(m,n)} \end{bmatrix},$$

where $\hat{\sigma}_{T_p}^2(m,n)$ is the estimate of the interference plus noise power, $(|g_{t,p}(m,n)|^2 + \sigma_p^2)$, on diversity branch p, the combined output of the signal quality weighting diversity combiner can be written as $$\hat{x}_1(m,n) = \underline{w}^H(m,n)\underline{y}(m,n).$$

Another preferred embodiment of a reception scheme for SC-OFDM is joint detection, which is sometimes also referred to as multi-user detection. A benefit of joint detection as compared to the diversity reception schemes described earlier is that joint detection does not require the use of diversity reception. However, it should be understood that diversity reception is still beneficial even when joint detection is employed.

Because SC-OFDM transmission uses a common frame and slot format, avoids ISI and ICI on desired and co-channel interfering signal components, and supports the measurement of the channel responses of the desired and interfering signal components, co-channel interfering signal components can be treated as joint desired signals in the detection process. That is, the sum of the desired and interfering signal components can be treated as a new desired signal called the joint desired signal. The joint desired signal is detected using a maximum likelihood or minimum Euclidean distance joint detector. Since there is no ISI or ICI, the joint detector operates on a symbol-by-symbol basis which results in a joint detector with relatively low complexity. For example, a joint detector based on a Euclidean distance metric determines estimates of the desired and interfering symbols by minimizing the following metric:

$$J_{\{\hat{x}_k(m,n)\}} = \left| y(m,n) - \sum_{k=1}^{K} \hat{x}_k(m,n)\hat{g}_k(m,n) \right|^2$$

where m is the subcarrier index, n is the baud interval index, y(m,n) is the received signal, and the second term, $\sum_k \hat{x}_k(m,n)$, represents the joint desired signal. For the joint desired signal, k is the transmitter index, K is the total number of transmitters being jointly detected, $\hat{g}_k(m,n)$ is the estimated channel response for the $k^{th}$ transmitter, and $\hat{x}_k(m,n)$ is the estimated value of the transmitted symbol from the $k^{th}$ transmitter. As described earlier, $\hat{g}_k(m,n)$ can be estimated based on the SC-OFDM orthogonal pilot code scheme with a multi-channel channel response measurement.

The K symbols $\{\hat{x}_1(m,n), \hat{x}_2(m,n), \ldots, \hat{x}_K(m,n)\}$ which minimize the metric, $J_{[\hat{x}_k(m,n)]}$, at the given m and n are the estimates (symbol decisions) of the transmitted symbols from the K transmitters. Without loss of generality, the desired signal will be assumed to be from the transmitter with k=1, and all other values of k are assumed to be associated with interfering transmitters.

For diversity reception, the Euclidean distance metric is extended to encompass the signals from all of the diversity branches. The metric to be minimized for joint detection with P branch diversity reception is $$J_{\{\hat{x}_k(m,n)\}} = \sum_{p=1}^{P} \dfrac{\left| y_p(m,n) - \sum_{k=1}^{K} \hat{x}_k(m,n)\hat{g}_{pk}(m,n) \right|^2}{\sigma_p^2}$$

where p is the index of the diversity branch, and $\sigma_p^2$ is the noise variance on the $p^{th}$ branch.

In a preferred embodiment of an SC-OFDM receiver, the measured channel responses of the desired and interfering signals are used to estimate signal quality. The signal quality information is used to improve other aspects of receiver operation. These aspects include, but are not limited to, soft decision weighting for a decoder, mobile assisted handoff, bit error rate estimation, interference power estimation, and desired signal power estimation.

As part of the demodulation of a received OFDM signal, an OFDM receiver estimates a symbol timing phase. The symbol timing phase, in turn, determines the boundaries on a block of samples which are passed to the FFT demodulator. If the transmitted OFDM signal includes a cyclic extension portion, an offset in the timing phase at the receiver does not necessarily cause ISI and ICI. However, even if ISI and ICI are not introduced, a offset in the symbol timing phase causes an additional phase difference between the demodulated signals from different subcarriers. This additional phase difference, which is introduced by an offset in the timing phase, will be referred to as subcarrier phase difference. Note that multipath delay spread and the values of the data symbols also cause phase differences between the demodulated signals from different subcarriers, but the term subcarrier phase difference is used to refer to the portion of phase difference that is due to the symbol timing phase used for demodulation. The subcarrier phase difference can be shown to be a phase difference which is constant between adjacent subcarriers. Thus, the subcarrier phase difference between a subcarrier with index $m_2$ and a subcarrier with index $m_1$ is $$\Delta\theta(m_2,m_1)=(m_2-m_1)\Delta\theta_{adj}$$

where $\Delta\theta_{adj}$ is the adjacent-subcarriers phase difference.

In some types of OFDM signals, subcarrier phase difference can degrade the performance of an OFDM receiver. One such case arises when the information in an OFDM signal is differentially encoded across adjacent subcarriers, such as DQPSK where the phase change representing an information symbol is encoded across two adjacent subcarriers. In this case, upon reception and demodulation, the subcarrier phase difference results in a phase bias in the output of the differential detector in the receiver. This phase bias may degrade the bit error rate performance of the receiver. Another such case arises when the OFDM signal includes known symbols on a plurality of subcarriers to support channel response measurement and subsequent interpolation filtering across a plurality of subcarriers. In this case, the subcarrier phase difference is indistinguishable from multipath delay spread induced channel variations. As a result, subcarrier phase difference appears as additional channel response variation in the interpolation filtering and this may reduce the accuracy of the interpolated channel response. The reduced accuracy of the interpolated channel response may degrade the bit error rate performance of the receiver.

In a preferred embodiment, an OFDM receiver estimates the adjacent-subcarriers phase difference and compensates for the estimated adjacent-subcarriers phase difference in the detection process, which may include channel response measurement and interpolation for coherent detection. The estimate, denoted as $\Delta\hat{\theta}_{adj}$, can be obtained by measuring an average adjacent-subcarriers phase difference based on a received signal containing known data such as the broadcast synchronization signal described earlier or known symbols within one or more slots. Alternatively, the measurement can be based on unknown valued data symbols in a slot. In the latter case, a nonlinearity can be used to remove the portion of the phase due to the value of the data symbol.

The measurement of the average adjacent-subcarriers phase difference is preferably made over several adjacent subcarriers and is averaged over a plurality of baud intervals to suppress noise and suppress phase variations which are caused by multipath delay spread.

When the OFDM signal includes known symbols on a plurality of subcarriers to support channel response measurement and subsequent interpolation filtering across a plurality of subcarriers, compensation is preferably incorporated into the detection process by modifying the pilot interpolation filtering coefficients which are used to generate the interpolated channel response measurements used for detection. As shown in the equation below, these coefficients become a function of the measured or estimated adjacent-subcarriers phase difference, which is denoted as $\Delta\hat{\theta}_{adj}$.

$$\hat{g}(m,n) = \sum_{p=1}^{P} h_p(m,n)\hat{g}_p(m_p,n_p)\exp(-j(m_p-m)\Delta\hat{\theta}_{adj})$$

In the above equation, $\hat{g}(m,n)$ is an interpolated channel response measurement at the $m^{th}$ subcarrier and $n^{th}$ baud interval generated by interpolation filtering between the channel response measurements, $\hat{g}_p(m_p,n_p)$, at the $m_p^{th}$ subcarriers and $n_p^{th}$ baud intervals generated using known symbols. The interpolation filtering coefficients, $h_p(m,n)$, are preferably predetermined for each interpolated channel response measurement location ($m^{th}$ subcarrier and $n^{th}$ baud interval) given a set of known symbol locations ($m_p^{th}$ subcarriers and $n_p^{th}$ baud intervals, where $1 \leq p \leq P$). The phase compensation term, $\exp(-j(m_p-m)\Delta\hat{\theta}_{adj})$, compensates for the phase difference between each known symbol location and the location of the interpolated channel response measurement, where ($m_p-m$) is the number of subcarriers between the two locations and $\Delta\hat{\theta}_{adj}$ is the measured adjacent-subcarriers phase difference as described earlier. In an alternate embodiment, compensation is implemented as a phase modification of the demodulated signal on each subcarrier prior to channel response measurement and interpolation filtering. The phase modification for each subcarrier is based on the measured adjacent-subcarriers phase difference and the equation for subcarrier phase difference given earlier and may be performed by an adjacent-subcarriers phase difference compensation unit. The algebraic sign of the phase modification value is selected to cancel the subcarrier phase difference on the demodulated signal.

When the information in the OFDM signal is differentially encoded across adjacent subcarriers, the phase modification is preferably implemented in a detector which includes a conventional differential detector followed by a phase modifier which modifies the phase of the output of the differential detector. The value of the differential phase medication is based on the measured adjacent-subcarriers phase difference. The algebraic sign of the differential phase modication value is selected to cancel the measured adjacent-subcarriers phase difference. The same differential phase modification value can be used for a plurality of differential detector outputs. In an alternate embodiment, compensation is implemented as a phase modification of the demodulated signal on each subcarrier prior to differential detection.

In SC-OFDM, a received composite SC-OFDM signal can be viewed as the sum of indivdually weighted and delayed SC-OFDM signals originating from at least two SC-OFDM transmitters. For the link between each SC-OFDM transmitter and the given SC-OFDM receiver, the weights correspond to the appropriate complex channel gain and the delays correspond to the propagation delay. Given that each link will likely have a different propagation delay and that the SC-OFDM receiver only chooses a single symbol timing phase to demodulate the entire received composite SC-OFDM signal, each component of this composite SC-OFDM signal will likely have a different adjacent-subcarriers phase difference after demodulation.

In a preferred embodiment of an SC-OFDM receiver, the adjacent-subcarriers phase difference is measured for each component of a given composite SC-OFDM signal. The measurement of a plurality of adjacent-subcarriers phase differences is also referred to as multi-channel adjacent-subcarriers phase difference measurement. For each component, these measurements can be performed using the techniques described above for OFDM receivers. A preferred embodiment of an SC-OFDM receiver also uses interpolation filtering in the detection process to calculate channel response measurements at subcarriers which do not contain pilot codes. Interpolation filtering is preferably performed separately for each component of the received composite SC-OFDM signal and the adjacent-subcarriers phase difference for each component is preferably compensated for during the corresponding interpolation filtering process. For each component, this interpolation and compensation can be accomplished in a manner similar to that described above for OFDM receivers.

In another preferred embodiment of an SC-OFDM receiver, the adjacent-subcarriers phase difference is measured only for a single component of a given composite SC-OFDM signal. Typically this single component corresponds to the SC-OFDM signal originating from the SC-OFDM transmitter in the same cell as the given SC-OFDM receiver and, as such, is known as the desired signal component. This embodiment of an SC-OFDM receiver also uses interpolation filtering in the detection process to calculate channel response measurments at subcarrier locations which do not contain pilot codes. However, only the interpolation filtering for the desired component compensates for the appropriate adjacent-subcarriers phase difference. For the remaining components, the interpolation filtering only interpolates between either magnitudes or powers of the channel response measurements at each pilot code location effectively ignoring any subcarrier phase differences. In another alternate embodiment of an SC-OFDM receiver, the adjacent-subcarriers phase difference is measured only for the desired component of a given composite SC-OFDM signal. Interpolation filtering is also used in the detection process to calculate channel response measurments at subcarrier locations which do not contain pilot codes. In this case, however, interpolation filtering and subsequent adjcacent phase difference compensation is only used for the desired component of the given composite SC-OFDM signal. No form of interpolation filtering is used for the remaining components of the given composite SC-OFDM signal. In a final alternate embodiment of an SC-OFDM receiver, the adjacent-subcarriers phase difference is measured only for the desired component of an SC-OFDM receiver. This subcarrier phase difference for the desired component is compensated for prior to the channel response measurement and interpolation filtering processes. As a result, no compensation is necessary during the detection process. Moreover, no compensation is performed for the adjacent-subcarriers phase difference of the remaining components of the composite SC-OFDM signal.

Subcarrier phase difference, which is the portion of the phase difference between demodulated signals on different subcarriers difference attributable to the choice of symbol timing phase, was described in the preceding several paragraphs. The measurement and compensation of subcarrier phase difference for OFDM and SC-OFDM receivers was also described. A symbol timing shift introduces a linear variation in the subcarrier phase across subcarriers, similar to the way a frequency offset causes a linear variation in the phase of time domain single carrier signals. As a result, additional embodiments of the measurement and compensation of subcarrier phase difference in OFDM signals may be based on methods in the art for measuring and compensating a frequency offset in time domain signals. In the case of subcarrier phase difference, the techniques need to be applied to the frequency domain signal. That is, they are applied to the signals across subcarriers rather than across time.

Although the SC-OFDM transmission scheme has been described in the context of a downlink, SC-OFDM is also applicable to uplink transmissions. One of the requirements of SC-OFDM, namely synchronized transmission times among co-channel transmitters, may need to be implemented differently than was described for downlink transmissions. Uplink transmissions may originate from mobile subscriber units which are not connected to a common network clock signal. Therefore, a different method is needed to synchronize uplink transmissions to a common time reference. In a preferred embodiment, an uplink transmitter in a subscriber unit determines transmit timing based on a closed loop timing adjustment scheme. Such closed loop timing adjustment schemes are known in the art. In such a scheme, the receiver in a base unit measures a timing offset of a received uplink transmission from a subscriber unit. The timing offset is obtained by comparing the timing of the received signal with the time reference of the base unit. The timing offset value is transmitted to the subscriber unit and the subscriber unit adjusts its time reference for transmission to coincide with the time reference of the base unit.

An important aspect of a closed loop timing adjustment scheme is that the reference clock of the subscriber unit will be adjusted differently based on the distance between the subscriber unit and the base unit. As a result, two properly adjusted subscriber units in the same sector that are located at different distances from the base unit will transmit at different times because of a difference in propagation delay. Their uplink transmissions will arrive at the base unit simultaneously in accordance with the time reference of the base unit. Therefore, for uplink transmissions, the transmission time reference of subscriber units is not necessarily the same. However, the transmission times are still defined to be synchronized because they are adjusted such that uplink transmissions are received by the base unit with timing that coincides with the time reference of the base unit.

A pilot code scheme for the uplink can be made very similar to the pilot code scheme of the downlink. For example, a subscriber unit can use the same pilot code for uplink transmission as was used for downlink reception. A different pilot code can be used for uplink transmission, but the use of pilot codes in co-channel sectors must be coordinated by an uplink pilot code re-use pattern.

Figure 13:
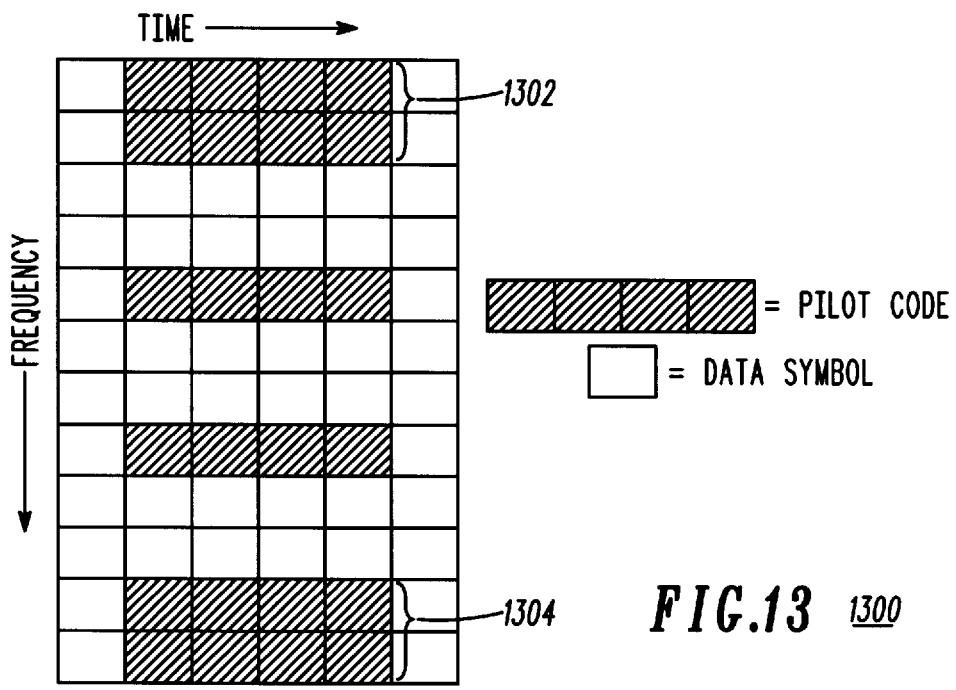
FIG. 13 is a graphical representation of an embodiment of a slot for an uplink wherein a pilot code is placed on adjacent subcarriers for first and second subcarriers, and the eleventh and twelfth subcarriers.

Measurement of subcarrier phase difference on the co-channel interfering signals, if needed, is more difficult in the case of the uplink because there is not a broadcast synchronization signal as was employed in the downlink. There is not a capability for a broadcast synchronization signal in the uplink because the uplink consists of a "many-to-one" rather than a "one-to-many" transmission architecture. In a preferred embodiment, the adjacent-subcarriers phase difference is measured based on the pilot codes within an uplink slot. If interpolation is used across subcarriers, the frequency spacing of some pilot codes in an uplink slot is preferably made small so that adjacent-subcarriers phase difference can be measured without phase wraparound effects. This format may result in higher pilot code overhead in an uplink slot because the number of pilot codes within a slot may need to be increased to provide the closer pilot code spacing. An example of a suitable uplink slot structure is shown in FIG. 13, numeral 1300. FIG. 13 is a graphical representation of an embodiment of a slot for an uplink wherein a pilot code is placed on adjacent subcarriers for first and second subcarriers (1302), and the eleventh and twelfth subcarriers (1304).

This slot structure contains 12 subcarriers and 6 symbol intervals. The slot contains two sets of pilot codes located on adjacent subcarriers to enable the adjacent-subcarriers phase difference to be measured without phase wraparound effects.

FIG. 14, numeral 1400, is a block diagram of one embodiment of an SC-OFDM system in accordance with the present invention. The synchronous coherent orthogonal frequency division multiplexing, SC-OFDM, system includes a plurality of SC-OFDM transmitters (1402, 1404, . . . 1406) and a plurality of SC-OFDM receivers (1412, 1414, . . . 1416). Each SC-OFDM transmitter (1402, 1404, . . . 1406) is synchronized to a reference, where the reference is derived from a common source, for transmitting SC-OFDM signals. Typically, the common reference may be a network clock connected by a wireline (1410) or may be a global positioning system (1408). The SC-OFDM receivers (1412, 1414, . . . 1416) are arranged to receive the SC-OFDM signals from at least one of the plurality of SC-OFDM transmitters (1402, 1404, . . . 1406). The SC-OFDM signals each have a cyclic extension, and the SC-OFDM signals from each SC-OFDM transmitter (1402, 1404, . . . 1406) include at least one pilot code in accordance with a predetermined pilot code scheme. The predetermined pilot code scheme is typically a scheme such as those described above. The cyclic extension generally has a duration based at least in part on inter-SC-OFDM transmitter propagation delay.

The at least one pilot code typically includes a sequence from a set of sequences with minimal/zero/known cross-correlation, and the predetermined pilot code scheme places each pilot code in a predetermined set of symbol locations. Where a number of SC-OFDM transmitters exceeds a number of sequences in the set of sequences, a same pilot code is utilized by at least two SC-OFDM transmitters. Either each SC-OFDM transmitter is in a base unit and each SC-OFDM receiver is in a subscriber unit, or each SC-OFDM transmitter is in a subscriber unit and each SC-OFDM receiver is in a base unit, or, alternatively, the base unit and subscriber unit both have at least one SC-OFDM transmitter and an SC-OFDM receiver.

In one embodiment, the base unit further includes a transmitter, the subscriber unit further includes a receiver, and the reference derived from the common source is based on a closed loop timing adjustment scheme.

The cyclic extension may further be based on a duration of a channel impulse response.

In one embodiment, the plurality of SC-OFDM transmitters may be co-located.

The SC-OFDM transmitters and SC-OFDM receivers are typically implemented in one of: A) an application-specific integrated circuit (ASIC); B) a digital signal processor (DSP); C) a processor; D) code; and E) a combination of at least two of A–D. Where the an element of the invention is implemented by code, lines of code are represented by the element in the figures.

Figure 15:
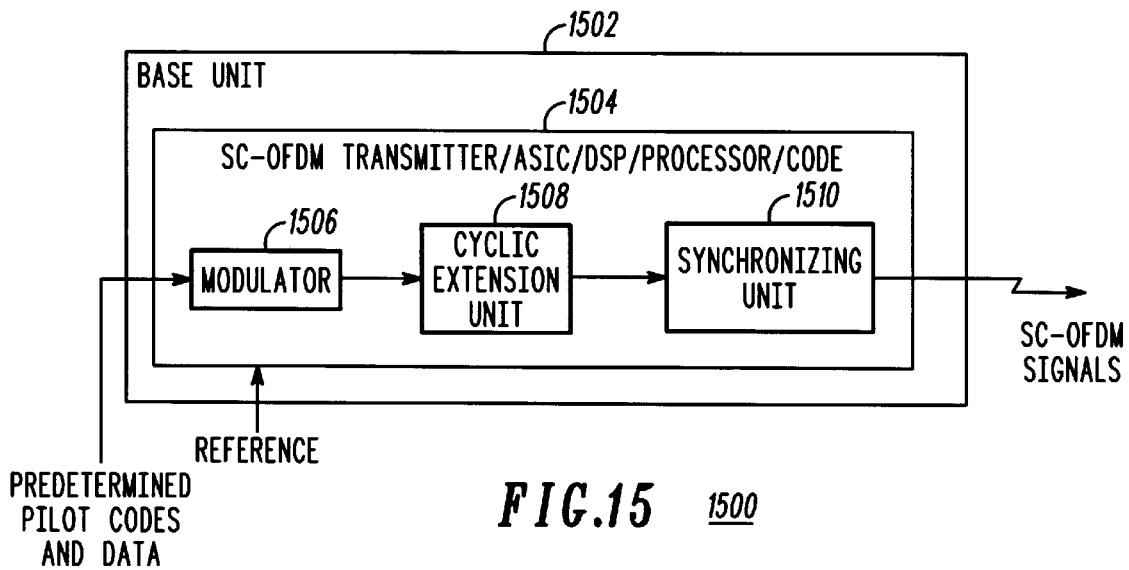
FIG. 15 is a block diagram of one embodiment of a base unit having an SC-OFDM transmitter/ASIC/DSP/processor/code for transmitting SC-OFDM signals in accordance with the present invention.

FIG. 15, numeral 1500, is a block diagram of a base unit (1502) having an SC-OFDM transmitter/ASIC/DSP/processor/code (1504) synchronized to a reference where the reference is derived from a common source, for transmitting SC-OFDM signals in accordance with the present invention. The SC-OFDM transmitter/ASIC/DSP/processor/code (1504) includes a modulator (1506), a cyclic extension unit (1508), and a synchronizing unit (1510). The modulator (1506) is coupled to receive predetermined pilot codes and data and is used for providing at least one OFDM signal in accordance with a predetermined pilot code scheme. The cyclic extension unit (1508) is coupled to the modulator (1506) and is used for extending the at least one OFDM signal using a cyclic extension. The synchronizing unit (1510) is coupled to the cyclic extension unit (1508) and to receive a time reference signal. The synchronizing unit (1510) is utilized for deriving a local reference signal from the time reference signal and synchronizing transmission of an at least one SC-OFDM signal of the SC-OFDM transmitter in accordance with the local reference signal. Each SC-OFDM signal has a cyclic extension, and each SC-OFDM signal from the SC-OFDM transmitter includes at least one pilot code in accordance with the predetermined pilot code scheme.

As with the SC-OFDM system, the cyclic extension may have a duration based at least in part on inter-SC-OFDM transmitter propagation delay, and where selected, may further be based on a duration of a channel impulse response. The common source for the SC-OFDM transmitter is typically one of: a global positioning system; and a wireline network clock. The at least one pilot code generally includes a sequence from a set of sequences with minimal/zero/known cross-correlation and the predetermined pilot code scheme places each pilot code in a predetermined set of symbol locations. The predetermined set of symbol locations are typically the same as a predetermined set of symbol locations for another base unit containing another SC-OFDM transmitter. Where selected, a plurality of SC-OFDM transmitters may be arranged to be coupled to a directional antenna system.

The plurality of SC-OFDM transmitters may each use a different pilot code.

The SC-OFDM transmitter may, where selected, transmit at least one of: synchronization signals and identification signals. At least one of: the synchronization signals and the identification signals may typically be one of: A) non-interfering with a synchronization/identification signal from another SC-OFDM transmitter; and B) separable from a synchronization/identification signal from another SC-OFDM transmitter. Where selected, the SC-OFDM transmitter may transmit at least one of the synchronization signal and the identification signal at a different time/frequency/code than the synchronization/identification signal transmitted by the other SC-OFDM transmitter.

Where selected, the predetermined pilot codes and data may be spread across a frequency band in a set of predetermined frequency locations and modulated to form the at least one SC-OFDM signal.

Where selected, the predetermined pilot codes and data are moved from the set of predetermined frequency locations to another set of predetermined frequency locations according to a predetermined frequency hopping method.

Any or all of the modulator, cyclic extension unit, and/or synchronizing unit may be implemented in one of: A) an application-specific integrated circuit; B) a digital signal processor; C) a processor; D) code; and E) a combination of at least two of A–D.

Figure 16:
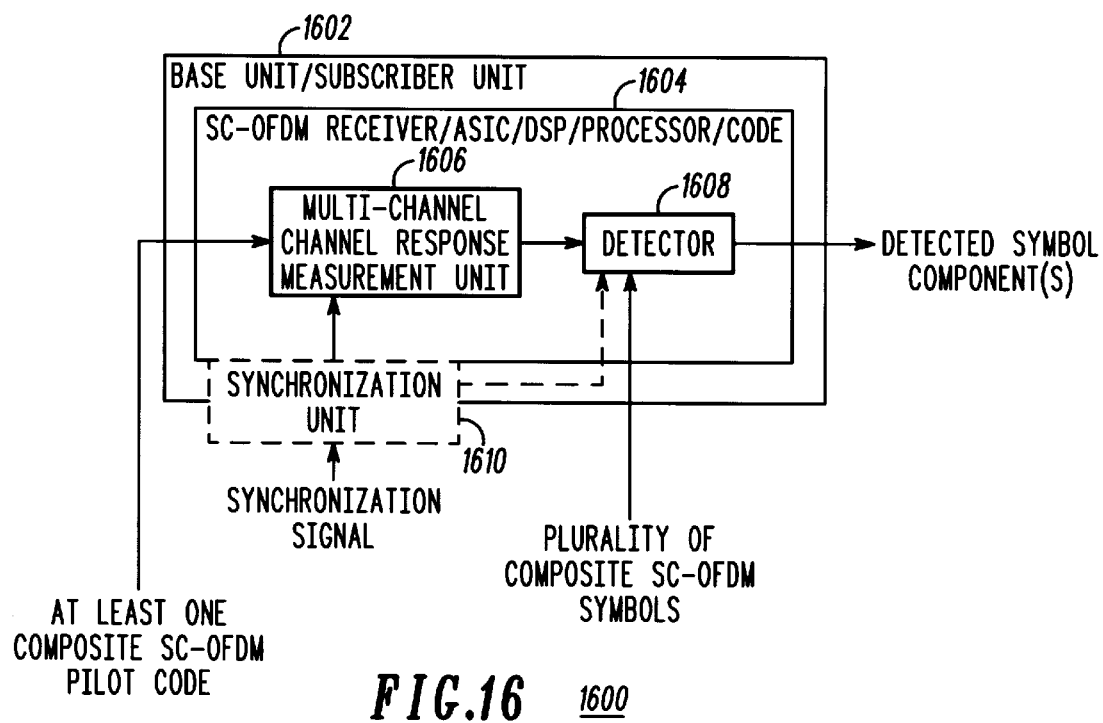
FIG. 16 is a block diagram of one embodiment of a base unit/subscriber unit having an SC-OFDM receiver/ASIC/DSP/processor/code for receiving SC-OFDM signals in accordance with the present invention.

FIG. 16, numeral 1600, is a block diagram of one embodiment of a base unit/subscriber unit (1602) having an SC-OFDM receiver/ASIC/DSP/processor/code (1604) for receiving SC-OFDM signals in accordance with the present invention. The SC-OFDM receiver/ASIC/DSP/processor/ code (1604) is arranged to receive at least one composite SC-OFDM signal demodulated and parsed into a plurality of composite SC-OFDM symbols and at least one composite SC-OFDM pilot code. The SC-OFDM receiver/ASIC/DSP/ processor/code (1604) includes A) a multi-channel channel response measurement unit (1606), arranged to receive the at least one composite SC-OFDM pilot code, for computing channel response measurements for a plurality of components of the composite SC-OFDM signal based on a plurality of associated pilot codes, and B) a detector (1608), coupled to the multi-channel channel response measurement unit (1606) and to receive at least one of the plurality of composite SC-OFDM symbols, for detecting at least one symbol component from the at least one composite SC-OFDM symbol based on the channel response measurement/measurements and the at least one composite SC-OFDM symbol.

The base unit may further include a transmitter for providing a common source based on a closed loop timing adjustment scheme. The detector may be selected to provide the at least one symbol component as a soft decision.

Where selected, a synchronization unit (1610) having a synchronization signal input may be coupled to the multi-channel response measurement unit (1606) for synchronizing receiver timing to a baud interval timing of a received synchronization signal, preferably an SC-OFDM signal.

Any or all of the multi-channel channel response measurement unit (1606), the detector (1608) and/or the synchronizing unit (1610) may be implemented in one of: A) an application-specific integrated circuit; B) a digital signal processor; C) a processor; D) code; and E) a combination of at least two of A–D.

Figure 17:
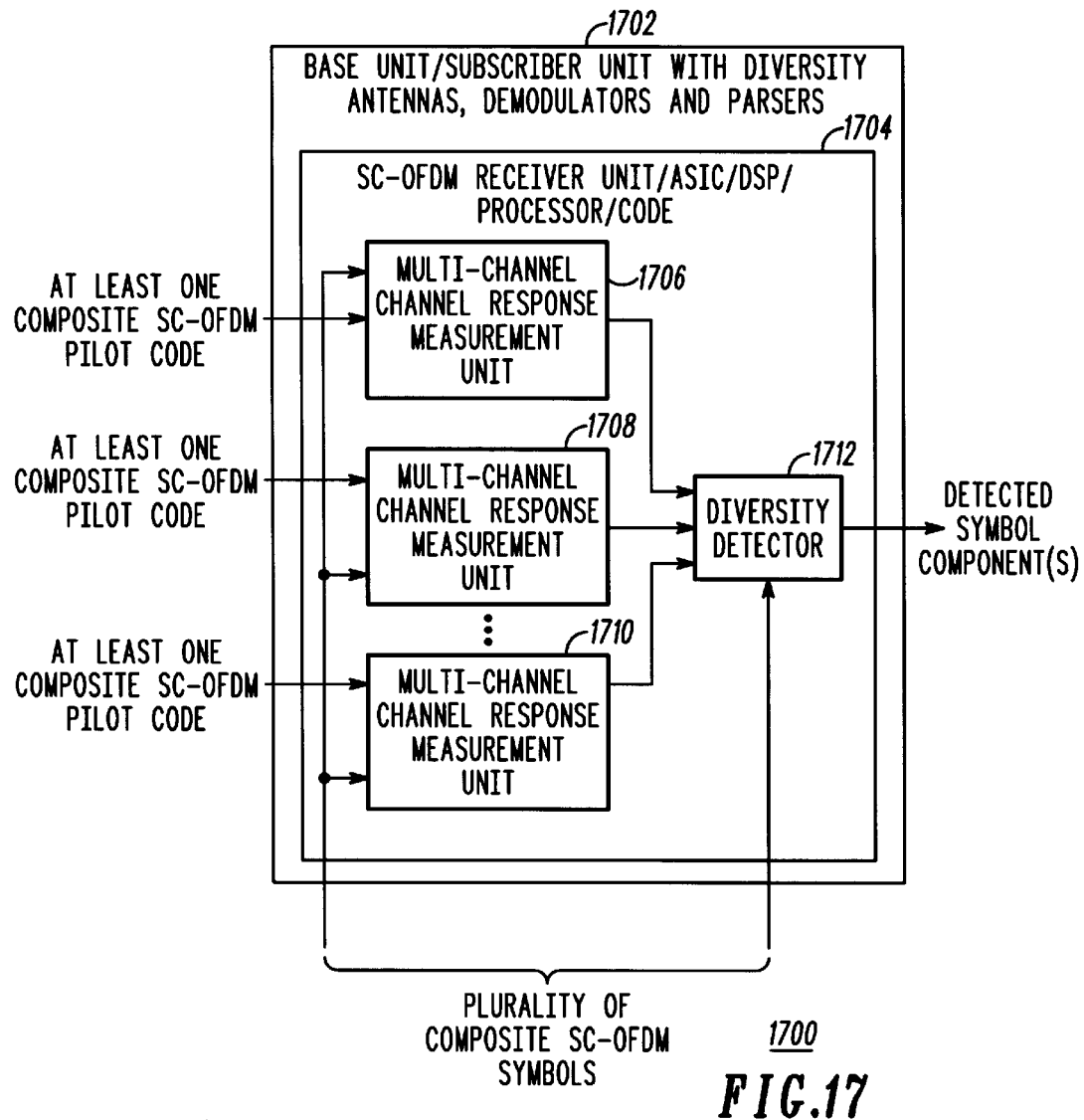
FIG. 17 is a block diagram of one embodiment of a base unit/subscriber unit with diversity antennas, having an SC-OFDM receiver unit/ASIC/DSP/processor/code in accordance with the present invention.

FIG. 17, numeral 1700, is a block diagram of one embodiment of a base unit/subscriber unit with diversity antennas, having an SC-OFDM receiver unit/ASIC/DSP/processor/ code (1704) in accordance with the present invention. The base unit has a synchronous coherent orthogonal frequency division multiplexing, SC-OFDM, receiver unit/ASIC/DSP/ processor/code (1704) having a plurality of diversity antennas arranged to receive a plurality of composite SC-OFDM signals demodulated and parsed into a plurality of composite SC-OFDM symbols and a plurality of composite SC-OFDM pilot codes. The SC-OFDM receiver unit/ASIC/DSP/ processor/code (1704) includes: a plurality of multi-channel channel response measurement units (1706, 1708, . . . , 1710), each arranged to receive at least one composite SC-OFDM pilot code and a plurality of composite SC-OFDM symbols, for computing channel response measurements for a plurality of components for each of the plurality of composite SC-OFDM signals based on a plurality of associated pilot codes, and a diversity detector (1712), coupled to the plurality of multi-channel channel response measurement units (1706, 1708, . . . , 1710) and to receive at least two of the plurality of composite SC-OFDM symbols, for detecting at least one symbol component from the composite SC-OFDM symbols based on the channel response measurements and the composite SC-OFDM symbols.

The diversity detector (1712) may be selected to provide the at least one symbol component as a soft decision. Any or all of the multi-channel channel response measurement units (1706, 1708, . . . , 1710) and/or the diversity detector (1712) may be implemented in one of: A) an application-specific integrated circuit; B) a digital signal processor; C) a processor; D) code; and E) a combination of at least two of A–D.

Figure 18:
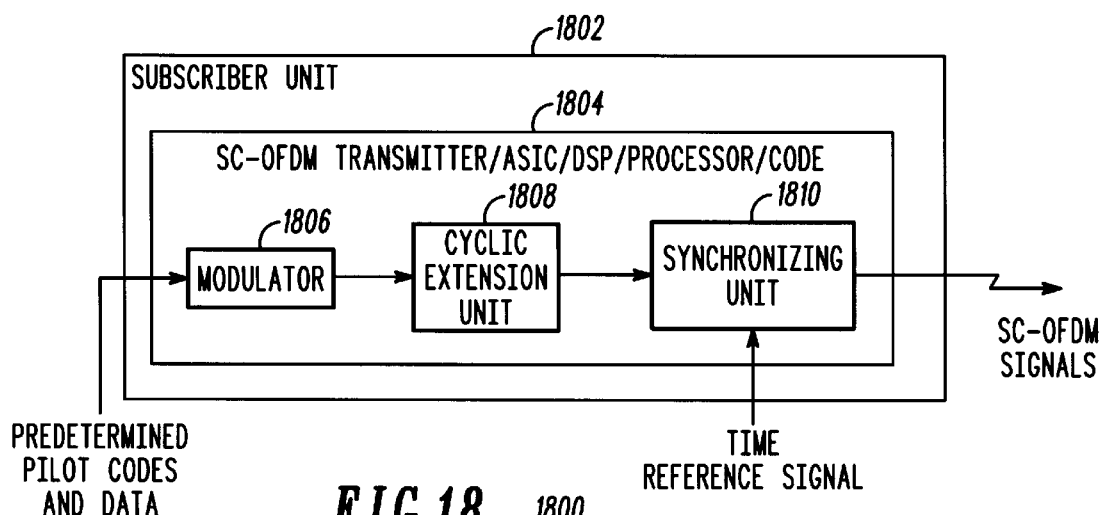
FIG. 18 is a block diagram of one embodiment of a subscriber unit having an SC-OFDM transmitter/ASIC/DSP/processor/code in accordance with the present invention.

FIG. 18, numeral 1800, is a block diagram of one embodiment of a subscriber unit (1802) having an SC-OFDM transmitter/ASIC/DSP/processor/code (1804) in accordance with the present invention. The subscriber unit has a synchronous, coherent, orthogonal frequency division multiplexing, SC-OFDM, transmitter/ASIC/DSP/processor/ code (1804) synchronized to a reference where the reference is derived from a common source, for transmitting SC-OFDM signals. The SC-OFDM transmitter/ASIC/DSP/ processor/code (1804) includes: a modulator (1806), coupled to receive predetermined pilot codes and data, for providing at least one OFDM signal in accordance with a predetermined pilot code scheme; a cyclic extension unit (1808), coupled to the modulator (1806), for extending the OFDM signal using a cyclic extension, and a synchronizing unit (1810), coupled to the cyclic extension unit (1808) and to receive a time reference signal, for deriving a local reference signal from the time reference signal and synchronizing transmission of an SC-OFDM signal of the SC-OFDM transmitter in accordance with the local reference signal, wherein, the SC-OFDM signals each have a cyclic extension and the SC-OFDM signals from the SC-OFDM transmitter include at least one pilot code in accordance with a predetermined pilot code scheme.

Typically, the at least one pilot code encompasses a sequence from a set of sequences with minimal/zero/known cross-correlation and the predetermined pilot code scheme places each pilot code in a predetermined set of symbol locations.

The cyclic extension may have a duration based at least in part on inter-SC-OFDM transmitter propagation delay. Further, where selected, the cyclic extension may be based on a duration of a channel impulse response.

The common source for the SC-OFDM transmitter is typically one of: a global positioning system and a wireline network clock.

The subscriber unit may further include a receiver, and the reference derived from the common source may be based on a closed loop timing adjustment scheme.

Any or all of the modulator (1806), cyclic extension unit (1808), and/or synchronizing unit (1810) may be implemented in one of: A) an application-specific integrated circuit; B) a digital signal processor; C) a processor; D) code; and E) a combination of at least two of A–D.

Figure 19:
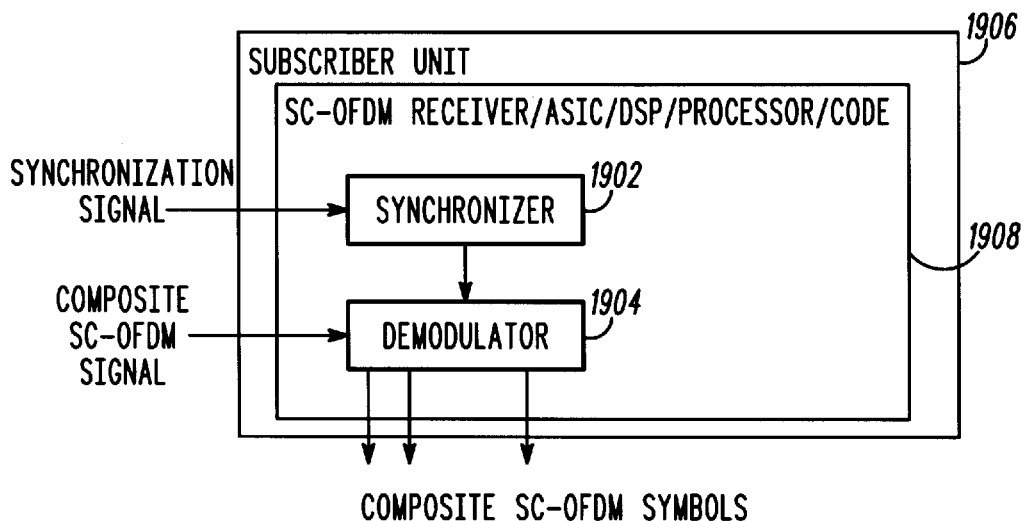
FIG. 19 is a block diagram of another embodiment of a subscriber unit having an SC-OFDM transmitter/ASIC/DSP/processor/code in accordance with the present invention.

FIG. 19, numeral 1900, is a block diagram of another embodiment of a subscriber unit (1802) having an SC-OFDM transmitter/ASIC/DSP/processor/code (1804) in accordance with the present invention. The subscriber unit (1906) has a synchronous coherent orthogonal frequency division multiplexing, SC-OFDM, receiver/ASIC/DSP/ processor/code (1908) arranged to receive at least one synchronization signal and at least one composite SC-OFDM signal. The SC-OFDM receiver/ASIC/DSP/ processor/code (1908) includes: A) a synchronizer (1902), arranged to receive the synchronization signal, for synchronizing receiver timing to a baud interval timing of a received SC-OFDM signal; and B) a demodulator (1904), coupled to the synchronizer (1902) and arranged to receive at least one composite SC-OFDM signal, for providing a plurality of composite SC-OFDM symbols.

Any or all of the synchronizer (1902) and/or the demodulator (1904) may be implemented in one of: A) an application-specific integrated circuit; B) a digital signal processor; C) a processor; D) code; and E) a combination of at least two of A–D.

In one embodiment, as shown in FIG. 16, the subscriber unit (1602) may have a synchronous coherent orthogonal frequency division multiplexing, SC-OFDM, receiver/ ASIC/DSP/processor/code (1604) arranged to receive at least one composite SC-OFDM signal demodulated and parsed into a plurality of composite SC-OFDM symbols and at least one composite SC-OFDM pilot code. The SC-OFDM receiver/ASIC/DSP/processor/code (1604) includes: A) a multi-channel channel response measurement unit (1606), arranged to receive the at least one composite SC-OFDM pilot code, for computing channel response measurements for a plurality of components for the composite SC-OFDM signal based on a plurality of associated pilot codes, and B) a detector (1608), coupled to the multi-channel channel response measurement unit (1606) and to receive at least one of the plurality of composite SC-OFDM symbols, for detecting at least one symbol component from the at least one composite SC-OFDM symbol based on the channel response measurement/measurements and the at least one composite SC-OFDM symbol. Other variations are as described for the base unit of FIG. 16.

In one embodiment, as shown in FIG. 17, the subscriber unit (1702) may have a synchronous coherent orthogonal frequency division multiplexing, SC-OFDM, receiver unit/ASIC/DSP/processor/code (1704) having a plurality of diversity antennas arranged to receive a plurality of composite SC-OFDM signals demodulated and parsed into a plurality of composite SC-OFDM symbols and a plurality of composite SC-OFDM pilot codes. The SC-OFDM receiver unit/ASIC/DSP/processor/code (1704) includes: A) a plurality of multi-channel channel response measurement units (1706, 1708, ..., 1710), each arranged to receive at least one composite SC-OFDM pilot code, for computing channel response measurements for a plurality of components for each of the plurality of composite SC-OFDM signals based on a plurality of associated pilot codes, and B) a diversity detector (1712), coupled to the plurality of multi-channel channel response measurement units (1706, 1708, ..., 1710) and to receive at least two of the plurality of composite SC-OFDM symbols, for detecting at least one symbol component from the composite SC-OFDM symbols based on the channel response measurements and the composite SC-OFDM symbols. Other variations are as described for the base unit of FIG. 17.

Figure 20:
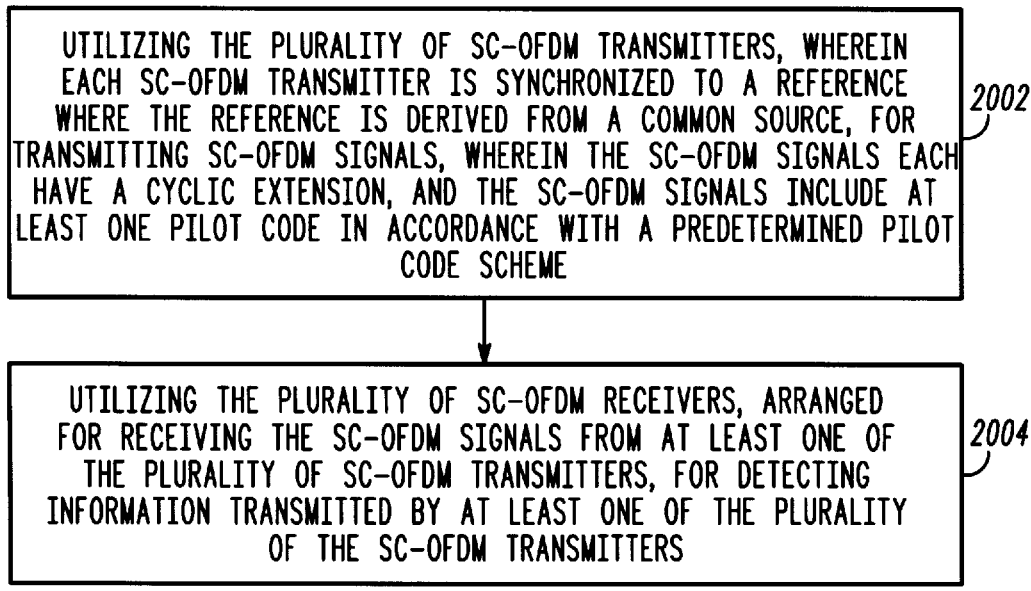
FIG. 20 is a flow chart of one embodiment of steps of a method for implementing SC-OFDM in accordance with the present invention.

FIG. 20, numeral 2000, is a flow chart of one embodiment of steps of a method for implementing SC-OFDM in accordance with the present invention. The method implements synchronous coherent orthogonal frequency division multiplexing utilizing a plurality of SC-OFDM transmitters and a plurality of SC-OFDM receivers. The method includes the steps of: A) utilizing (2002) the plurality of SC-OFDM transmitters, wherein each SC-OFDM transmitter is synchronized to a reference where the reference is derived from a common source, for transmitting SC-OFDM signals, wherein the SC-OFDM signals each have a cyclic extension, and the SC-OFDM signals include at least one pilot code in accordance with a predetermined pilot code scheme; and B) utilizing (2004) the plurality of SC-OFDM receivers, arranged for receiving the SC-OFDM signals from at least one of the plurality of SC-OFDM transmitters, for detecting information transmitted by at least one of the plurality of the SC-OFDM transmitters.

The cyclic extension may have a duration based at least in part on inter-SC-OFDM transmitter propagation delay. The cyclic extension may further be based on a duration of a channel impulse response.

The common source is typically one of: a global positioning system; and a wireline network clock. The reference derived from the common source may be based on a closed loop timing adjustment scheme.

The steps of the method may typically be implemented in one of: A) an integrated circuit; B) a digital signal processor; C) a processor; D) code; and E) a combination of at least two of A–D.

Figure 21:
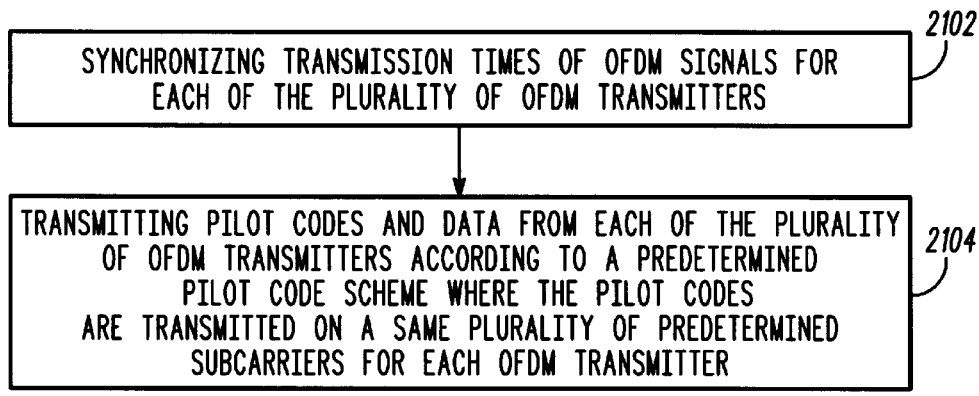
FIG. 21 is a flow chart of one embodiment of steps of a method for implementing SC-OFDM in accordance with the present invention.

FIG. 21, numeral 2100, is a flow chart of one embodiment of steps of a method for implementing SC-OFDM in accordance with the present invention. A method for implementing synchronous coherent orthogonal frequency division multiplexing transmission utilizing a plurality of OFDM transmitters, includes the steps of: A) synchronizing (2102) transmission times of OFDM signals for each of the plurality of OFDM transmitters; B) transmitting (2104) pilot codes and data from each of the plurality of OFDM transmitters according to a predetermined pilot code scheme where the pilot codes are transmitted on a same plurality of predetermined subcarriers for each OFDM transmitter. The steps of the method are typically implemented in one of: A) an application-specific integrated circuit; B) a digital signal processor; C) a processor; D) code; and E) a combination of at least two of A–D.

Figure 22:
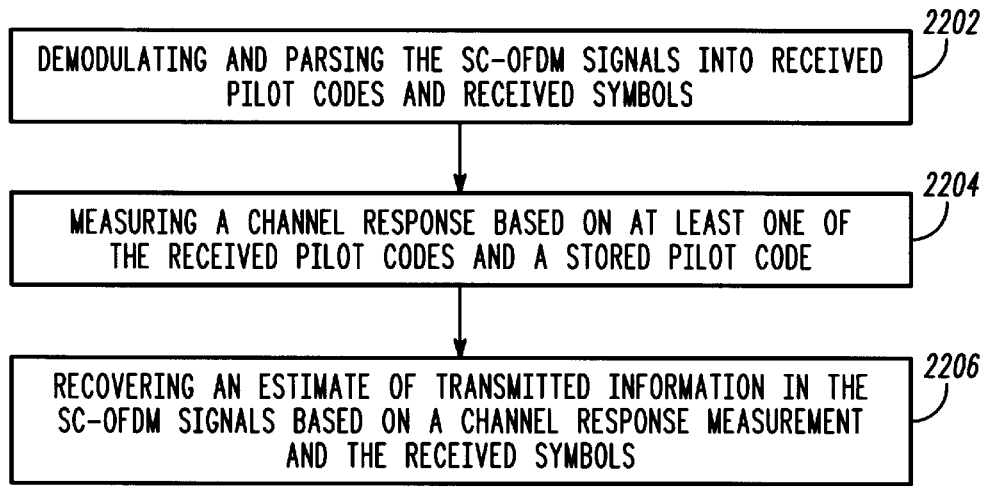
FIG. 22 is a flow chart of one embodiment of steps of a method for implementing SC-OFDM reception in accordance with the present invention.

FIG. 22, numeral 2200, is a flow chart of one embodiment of steps of a method for implementing SC-OFDM reception in accordance with the present invention. The method for implementing synchronous coherent orthogonal frequency division multiplexing reception utilizing an OFDM receiver arranged to receive SC-OFDM signals includes the steps of:

A) demodulating and parsing (2202) the SC-OFDM signals into received pilot codes and received symbols; B) measuring (2204) a channel response based on at least one of the received pilot codes and a stored pilot code; C) recovering (2206) an estimate of transmitted information in the SC-OFDM signals based on a channel response measurement and the received symbols.

The steps of the method are typically implemented in one of: A) an application-specific integrated circuit; B) a digital signal processor; C) a processor; D) code; E) a combination of at least two of A–D.

Figure 23:
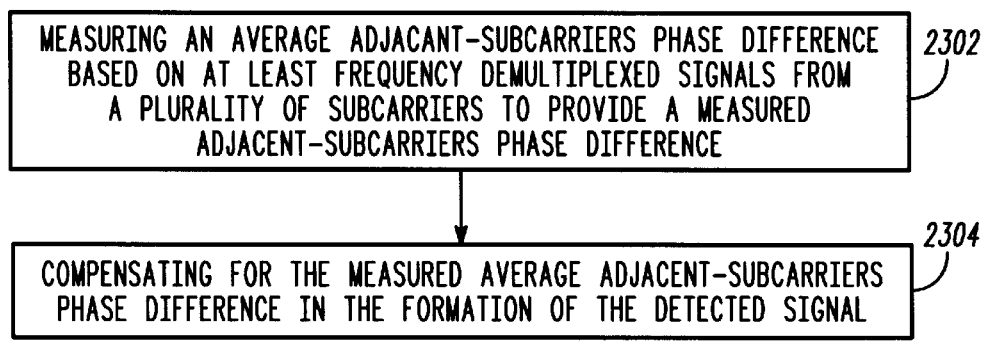
FIG. 23 is a flow chart of one embodiment of steps of a method for implementing efficient OFDM reception in accordance with the present invention.

FIG. 23, numeral 2300, is a flow chart of one embodiment of steps of a method for implementing efficient OFDM reception in accordance with the present invention. The method provides efficient orthogonal frequency division multiplexing reception upon receiving at least one orthogonal frequency division multiplexing signal, where the receiver uses at least frequency demultiplexed signals from a plurality of subcarriers to provide a detected signal. The method includes the steps of: A) measuring (2302) an average adjacent-subcarriers phase difference based on at least frequency demultiplexed signals from a plurality of subcarriers to provide a measured adjacent-subcarriers phase difference; and B) compensating (2304) for the measured average adjacent-subcarriers phase difference in the formation of the detected signal.

The steps of the method are typically implemented in one of: A) an application-specific integrated circuit; B) a digital signal processor; C) a processor; D) code; E) a combination of at least two of A–D.

Figure 24:
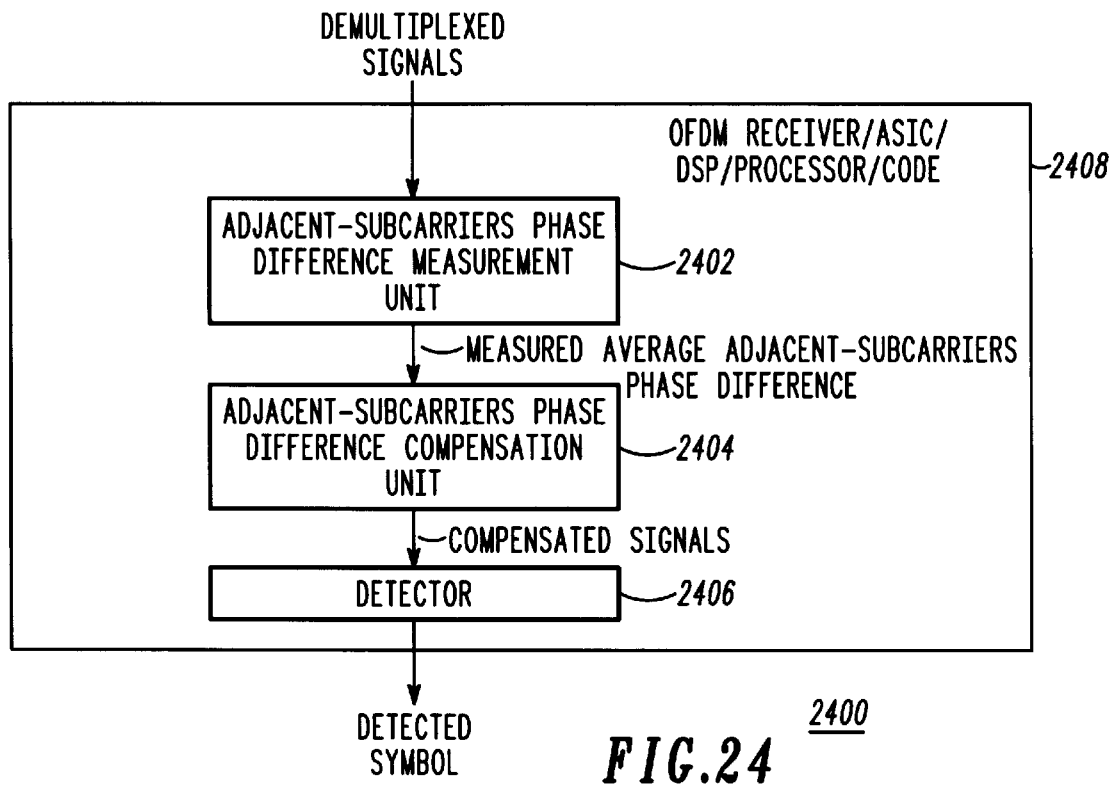
FIG. 24 is a block diagram of one embodiment of an OFDM receiver for receiving at least one orthogonal frequency division multiplexing signal, frequency demultiplexing the signal into a plurality of demultiplexed signals from a plurality of subcarriers, and for detecting at least one symbol from the demultiplexed signals in accordance with the present invention.

FIG. 24, numeral 2400, is a block diagram of one embodiment of an orthogonal frequency division multiplexing OFDM receiver for receiving at least one orthogonal frequency division multiplexing signal, frequency demultiplexing the signal into a plurality of demultiplexed signals from a plurality of subcarriers, and for detecting at least one symbol from the demultiplexed signals in accordance with the present invention. The OFDM receiver (2408) includes: A) an adjacent-subcarriers phase difference measurement unit (2402), coupled to receive the demultiplexed signals, for measuring an average adjacent-subcarriers phase difference, to provide a measured average adjacent-subcarriers phase difference; B) an adjacent-subcarriers phase difference compensation unit (2404), coupled to the adjacent-subcarriers phase difference measurement unit and the demultiplexed signals, for compensating the demultiplexed signals for the measured average adjacent-subcarriers phase difference to provide compensated signals; and C) detector (2406), coupled to the adjacent-subcarriers phase difference compensation unit, for detecting at least one symbol to provide at least one detected symbol, based on at least the compensated signals.

Figure 25:
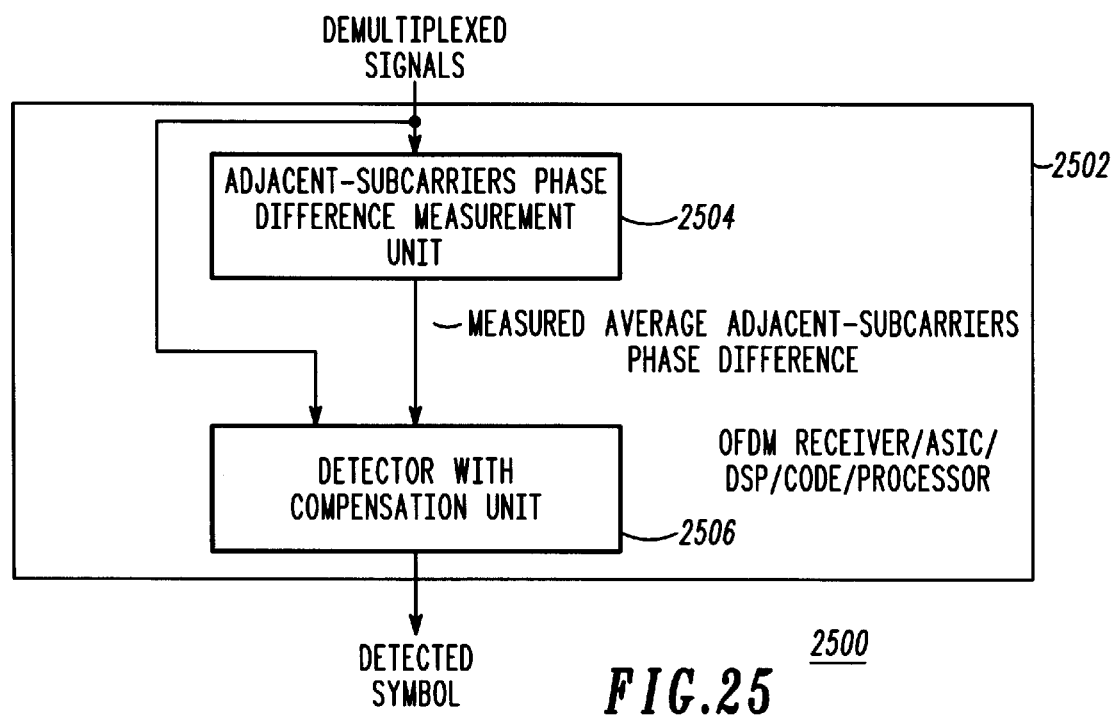
FIG. 25 is a block diagram of one embodiment of an OFDM receiver for receiving at least one orthogonal frequency division multiplexing signal, frequency demultiplexing the signal into a plurality of demultiplexed signals from a plurality of subcarriers, and for detecting at least one symbol from the demultiplexed signals in accordance with the present invention.

FIG. 25, numeral 2500, is a block diagram of one embodiment of an orthogonal frequency division multiplexing (OFDM) receiver (2502) for receiving at least one orthogonal frequency division multiplexing signal, frequency demultiplexing the signal into a plurality of demultiplexed signals from a plurality of subcarriers, and for detecting at least one symbol from the demultiplexed signals in accordance with the present invention. The OFDM receiver includes: A) an adjacent-subcarriers phase difference measurement unit (2504), coupled to receive the demultiplexed signals, for measuring an average adjacent-subcarriers phase difference to provide a measured average adjacent-subcarriers phase difference; and B) a detector with compensation unit (2506), coupled to the adjacent-subcarriers phase difference measurement unit (2504) and the demultiplexed signals, for providing at least one detected symbol based on at least the demultiplexed signals and the measured adjacent-subcarriers phase difference.

Figure 26:
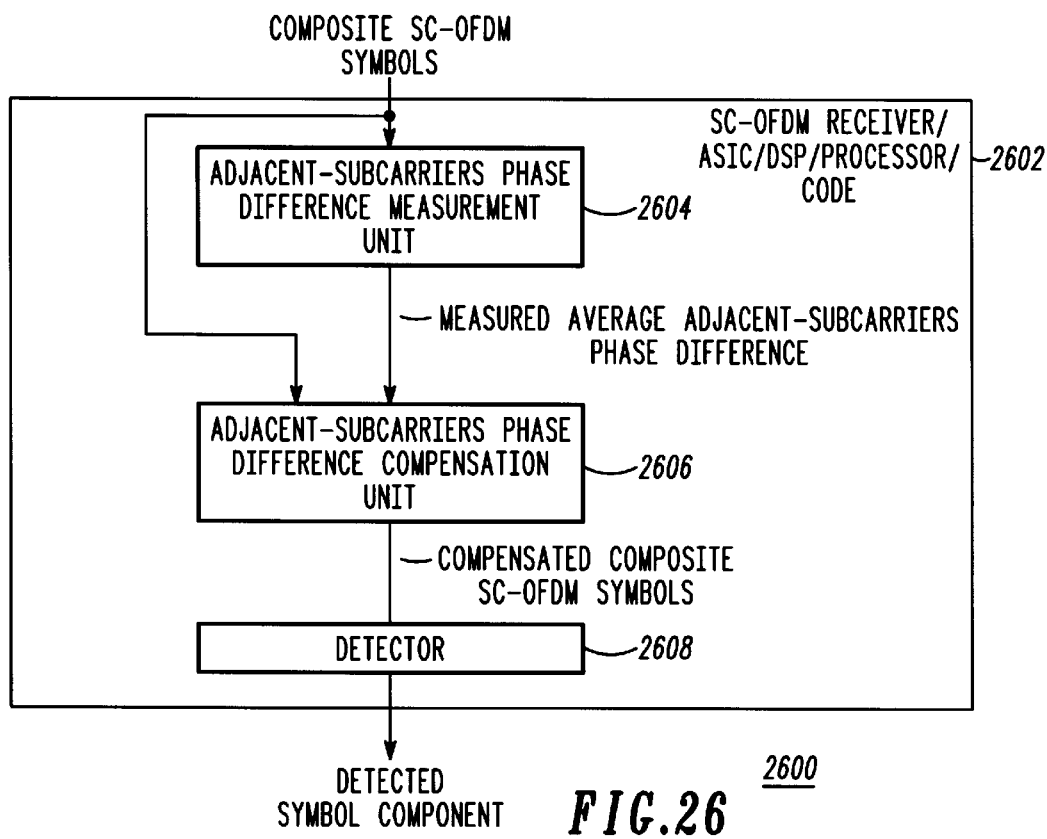
FIG. 26 is a block diagram of one embodiment of an SC-OFDM receiver for receiving at least one composite SC-OFDM signal, frequency demultiplexing the composite SC-OFDM signal into a plurality of composite SC-OFDM symbols from a plurality of subcarriers, and for detecting at least one symbol component from at least one composite SC-OFDM symbol in accordance with the present invention.

FIG. 26, numeral 2600, is a block diagram of one embodiment of a synchronous coherent orthogonal frequency division multiplexing, SC-OFDM, receiver for receiving at least one composite SC-OFDM signal, frequency demultiplexing the composite SC-OFDM signal into a plurality of composite SC-OFDM symbols from a plurality of subcarriers, and for detecting at least one symbol component from at least one composite SC-OFDM symbol in accordance with the present invention. The SC-OFDM receiver (2602) includes: A) an adjacent-subcarriers phase difference measurement unit (2604), coupled to receive the composite synchronous coherent orthogonal frequency division multiplexing symbols, for measuring an average adjacent-subcarriers phase difference, to provide a measured average adjacent-subcarriers phase difference; B) an adjacent-subcarriers phase difference compensation unit (2606), coupled to the adjacent-subcarriers phase difference measurement unit (2606) and the composite SC-OFDM symbols, for compensating the composite SC-OFDM symbols for the measured average adjacent-subcarriers phase difference to provide compensated composite SC-OFDM symbols; and C) a detector (2608), coupled to the adjacent-subcarriers phase difference compensation unit (2606), for detecting at least one symbol component of at least one composite SC-OFDM symbol to provide at least one detected symbol component based on at least the compensated composite SC-OFDM symbols.

Figure 27:
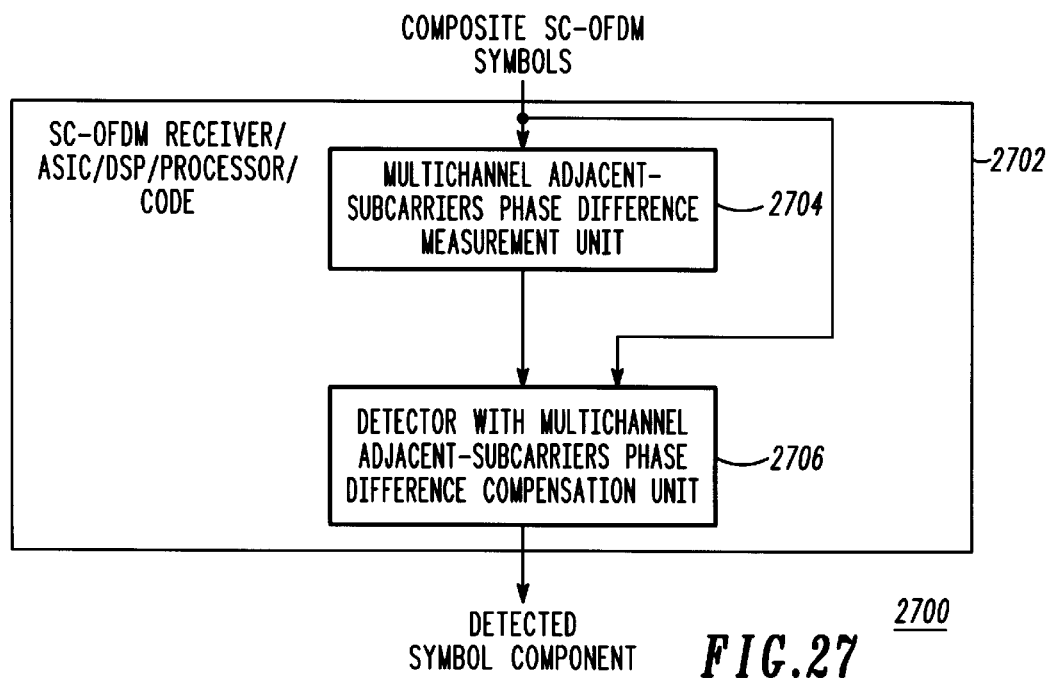
FIG. 27 is a block diagram of one embodiment of an SC-OFDM receiver for receiving at least one composite SC-OFDM signal, frequency demultiplexing the composite SC-OFDM signal into a plurality of composite SC-OFDM symbols from a plurality of subcarriers, and for detecting at least one symbol component from at least one composite SC-OFDM symbol in accordance with the present invention.

FIG. 27, numeral 2700, is a block diagram of one embodiment of a synchronous coherent orthogonal frequency division multiplexing, SC-OFDM, receiver (2702) for receiving at least one composite SC-OFDM signal, frequency demultiplexing the composite SC-OFDM signal into a plurality of composite SC-OFDM symbols from a plurality of subcarriers, and for detecting at least one symbol component from at least one composite SC-OFDM symbol in accordance with the present invention. The SC-OFDM receiver (2702) includes: A) a multichannel adjacent-subcarriers phase difference measurement unit (2704), coupled to receive the composite SC-OFDM symbols, for measuring an average adjacent-subcarriers phase difference for a plurality of components of the composite SC-OFDM symbols, to provide a plurality of measured average adjacent-subcarriers phase differences; and B) a detector with multichannel adjacent-subcarriers phase difference compensation unit (2706), coupled to the multichannel adjacent-subcarriers phase difference measurement unit (2704) and the composite SC-OFDM symbols, for detecting at least one symbol component of at least one composite SC-OFDM symbol to provide at least one detected symbol component based on at least the compensated composite SC-OFDM symbols and the plurality of measured average adjacent-subcarriers phase differences.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A synchronous coherent orthogonal frequency division multiplexing, SC-OFDM, system that includes a plurality of SC-OFDM transmitters and a plurality of SC-OFDM receivers, comprising:
    A) the plurality of SC-OFDM transmitters, wherein each SC-OFDM transmitter is synchronized to a reference where the reference is derived from a common source, for transmitting SC-OFDM signals; and
    B) the plurality of SC-OFDM receivers, arranged to receive the SC-OFDM signals from at least one of the plurality of SC-OFDM transmitters;
    wherein, in A and B, the SC-OFDM signals each have a cyclic extension, and the SC-OFDM signals from each SC-OFDM transmitter include at least one pilot code in accordance with a predetermined pilot code scheme.

2. The SC-OFDM system of claim 1 wherein the cyclic extension has a duration based at least in part on inter-SC-OFDM transmitter propagation delay.

3. The SC-OFDM system of claim 1 wherein the at least one pilot code is comprised of a sequence from a set of sequences with minimal/zero/known cross-correlation and the predetermined pilot code scheme places each pilot code in a predetermined set of symbol locations.

4. The SC-OFDM system of claim 3 wherein, where a number of SC-OFDM transmitters exceeds a number of sequences in the set of sequences, a same pilot code is utilized by at least two SC-OFDM transmitters.

5. The SC-OFDM system of claim 1 wherein each SC-OFDM transmitter is in a base unit and each SC-OFDM receiver is in a subscriber unit.

6. The SC-OFDM system of claim 1 wherein each SC-OFDM transmitter is in a subscriber unit and each SC-OFDM receiver is in a base unit.

7. The SC-OFDM system of claim 6 wherein the base unit further includes a transmitter, the subscriber unit further includes a receiver, and the reference derived from the common source is based on a closed loop timing adjustment scheme.

8. The SC-OFDM system of claim 1 wherein the cyclic extension is further based on a duration of a channel impulse response.

9. The SC-OFDM system of claim 1 where the common source is one of:

A) a global positioning system; and

B) a wireline network clock.

10. The SC-OFDM system of claim 1 wherein plurality of SC-OFDM transmitters are co-located.

11. The SC-OFDM system of claim 1 wherein the SC-OFDM transmitters and SC-OFDM receivers include one of:

A) an application-specific integrated circuit;

B) a digital signal processor;

C) a processor;

D) code; and

E) a combination of at least two of A–D.

12. A base unit having an SC-OFDM transmitter synchronized to a reference where the reference is derived from a common source, for transmitting SC-OFDM signals, the SC-OFDM transmitter comprising:

A) a modulator, coupled to receive predetermined pilot codes and data, for providing at least one OFDM signal in accordance with a predetermined pilot code scheme;

B) a cyclic extension unit, coupled to the modulator, for extending the at least one OFDM signal using a cyclic extension, and C) a synchronizing unit, coupled to the cyclic extension unit and to receive a time reference signal, for deriving a local reference signal from the time reference signal and synchronizing transmission of an at least one SC-OFDM signal of the SC-OFDM transmitter in accordance with the local reference signal, wherein, each SC-OFDM signal has a cyclic extension and each SC-OFDM signal from the SC-OFDM transmitter includes at least one pilot code in accordance with the predetermined pilot code scheme.

13. The base unit of claim 12 wherein the cyclic extension has a duration based at least in part on inter-SC-OFDM transmitter propagation delay.

14. The base unit of claim 12 wherein the cyclic extension is further based on a duration of a channel impulse response.

15. The base unit of claim 12 where the common source for the SC-OFDM transmitter is one of:

A) a global positioning system; and

B) a wireline network clock.

16. The base unit of claim 12 wherein the at least one pilot code is comprised of a sequence from a set of sequences with minimal/zero/known cross-correlation and the predetermined pilot code scheme places each pilot code in a predetermined set of symbol locations.

17. The base unit of claim 16 wherein the predetermined set of symbol locations are the same as a predetermined set of symbol locations for another base unit containing another SC-OFDM transmitter.

18. The base unit of claim 12 further having a plurality of SC-OFDM transmitters arranged to be coupled to a directional antenna system.

19. The base station of claim 18 wherein the plurality of SC-OFDM transmitters each use a different pilot code.

20. The base unit of claim 12 wherein the SC-OFDM transmitter transmits at least one of: synchronization signals and identification signals.

21. The base unit of claim 20 wherein at least one of: the synchronization signals and the identification signals are one of:

A) non-interfering with a synchronization/identification signal from another SC-OFDM transmitter; and B) separable from a synchronization/identification signal from another SC-OFDM transmitter.

22. The base unit of claim 20 wherein the SC-OFDM transmitter transmits at least one of the synchronization signal and the identification signal at a different time/frequency/code than the synchronization/identification signal transmitted by another SC-OFDM transmitter.

23. The base unit of claim 12 wherein the predetermined pilot codes and data are spread across a frequency band in a set of predetermined frequency locations and modulated to form the at least one SC-OFDM signal.

24. The base unit of claim 23 wherein the predetermined pilot codes and data are moved from the set of predetermined frequency locations to another set of predetermined frequency locations according to a predetermined frequency hopping method.

25. The base unit of claim 12 wherein the modulator/cyclic extension unit/synchronizing unit is implemented in one of:

A) an application-specific integrated circuit;

B) a digital signal processor;

C) a processor;

D) code; and

E) a combination of at least two of A–D.

26. A base unit having a synchronous coherent orthogonal frequency division multiplexing, SC-OFDM, receiver arranged to receive at least one composite SC-OFDM signal demodulated and parsed into a plurality of composite SC-OFDM symbols and at least one composite SC-OFDM pilot code, the SC-OFDM receiver comprising:

A) a multi-channel channel response measurement unit, arranged to receive the at least one composite SC-OFDM pilot code, for computing channel response measurements for a plurality of components of the composite SC-OFDM signal based on a plurality of associated pilot codes, and B) a detector, coupled to the multi-channel channel response measurement unit and to receive at least one of the plurality of composite SC-OFDM symbols, for detecting at least one symbol component from the at least one composite SC-OFDM symbol based on the channel response measurement/measurements and the at least one composite SC-OFDM symbol.

27. The base unit of claim 26 further including a transmitter for providing a common source based on a closed loop timing adjustment scheme.

28. The base unit of claim 26 wherein the detector provides the at least one symbol component as a soft decision.

29. The base unit of claim 26 wherein the multi-channel channel response measurement unit/detector is implemented in one of:

A) an application-specific integrated circuit;

B) a digital signal processor;

C) a processor;

D) code; and

E) a combination of at least two of A–D.

30. A base unit having a synchronous coherent orthogonal frequency division multiplexing, SC-OFDM, receiver unit having a plurality of diversity antennas arranged to receive a plurality of composite SC-OFDM signals demodulated and parsed into a plurality of composite SC-OFDM symbols and a plurality of composite SC-OFDM pilot codes, the SC-OFDM receiver unit comprising:

A) a plurality of multi-channel channel response measurement units, each arranged to receive at least one composite SC-OFDM pilot code and a plurality of composite SC-OFDM symbols, for computing channel response measurements for a plurality of components for each of the plurality of composite SC-OFDM signals based on a plurality of associated pilot codes, and B) a diversity detector, coupled to the plurality of multi-channel channel response measurement units and to receive at least two of the plurality of composite SC-OFDM symbols, for detecting at least one symbol component from the composite SC-OFDM symbols based on the channel response measurements and the composite SC-OFDM symbols.

31. The base unit of claim 30 wherein the diversity detector provides the at least one symbol component as a soft decision.

32. The base unit system of claim 30 wherein the multi-channel channel response measurement unit/diversity detector is implemented in one of:
A) an application-specific integrated circuit;
B) a digital signal processor;
C) a processor;
D) code; and
E) a combination of at least two of A–D.

33. A subscriber unit having a synchronous, coherent, orthogonal frequency division multiplexing, SC-OFDM, transmitter synchronized to a reference where the reference is derived from a common source, for transmitting SC-OFDM signals, the SC-OFDM transmitter comprising:
A) a modulator, coupled to receive predetermined pilot codes and data, for providing at least one OFDM signal in accordance with a predetermined pilot code scheme;
B) a cyclic extension unit, coupled to the modulator, for extending the OFDM signal using a cyclic extension, and
C) a synchronizing unit, coupled to the cyclic extension unit and to receive a time reference signal, for deriving a local reference signal from the time reference signal and synchronizing transmission of an SC-OFDM signal of the SC-OFDM transmitter in accordance with the local reference signal,
wherein, the SC-OFDM signals each have a cyclic extension and the SC-OFDM signals from the SC-OFDM transmitter include at least one pilot code in accordance with a predetermined pilot code scheme.

34. The subscriber unit of claim 33 wherein the at least one pilot code is comprised of a sequence from a set of sequences with minimal/zero/known cross-correlation and the predetermined pilot code scheme places each pilot code in a predetermined set of symbol locations.

35. The subscriber unit of claim 33 wherein the cyclic extension has a duration based at least in part on inter-SC-OFDM transmitter propagation delay.

36. The subscriber unit of claim 33 wherein the cyclic extension is further based on a duration of a channel impulse response.

37. The subscriber unit of claim 33 where the common source for the SC-OFDM transmitter is one of:
A) a global positioning system; and
B) a wireline network clock.

38. The subscriber unit of claim 33 further including a receiver, and wherein the reference derived from the common source is based on a closed loop timing adjustment scheme.

39. The subscriber unit of claim 33 wherein the modulator/the cyclic extension unit/synchronizing unit is implemented in one of:

A) an application-specific integrated circuit;
B) a digital signal processor;
C) a processor;
D) code; and
E) a combination of at least two of A–D.

40. A subscriber unit having a synchronous coherent orthogonal frequency division multiplexing, SC-OFDM, receiver arranged to receive at least one composite SC-OFDM signal demodulated and parsed into a plurality of composite SC-OFDM symbols and at least one composite SC-OFDM pilot code, the SC-OFDM receiver comprising:
A) a multi-channel channel response measurement unit, arranged to receive the at least one composite SC-OFDM pilot code, for computing channel response measurements for a plurality of components of the composite SC-OFDM signal based on a plurality of associated pilot codes, and
B) a detector, coupled to the multi-channel channel response measurement unit and to receive at least one of the plurality of composite SC-OFDM symbols, for detecting at least one symbol component from the at least one composite SC-OFDM symbol based on the channel response measurement/measurements and the at least one composite SC-OFDM symbol.

41. The subscriber unit of claim 40 wherein the detector provides the at least one symbol component as a soft decision.

42. The subscriber unit of claim 40 wherein a number of channel response measurements is greater than a number of the at least one composite SC-OFDM pilot code.

43. The subscriber unit of claim 40 wherein at least two composite SC-OFDM pilot codes are received and the multichannel channel response measurement unit further computes filtered channel response measurements for at least one component of the composite SC-OFDM signal by interpolation filtering the channel response measurements for the at least one component according to a predetermined interpolation filtering scheme.

44. The subscriber unit of claim 40 Wherein the multi-channel channel response measurement unit further computes an average phase difference between at least one of:
a number of the plurality of composite SC-OFDM symbols; and
a number of the at least one composite SC-OFDM pilot code.

45. The subscriber unit of claim 44 wherein the multi-channel channel response measurement unit further adjusts for the average phase difference by multiplying the at least one of
the number of the plurality of composite SC-OFDM symbols; and
the number of the at least one composite SC-OFDM pilot code by at least one phase adjustment factor.

46. The subscriber unit of claim 44 wherein the multi-channel channel response measurement unit further adjusts for the average phase difference by adjusting the predetermined interpolation filtering scheme.

47. The subscriber unit of claim 40 wherein the detector jointly detects a plurality of symbol components from the at least one composite SC-OFDM symbol in accordance with a predetermined joint detection scheme.

48. The subscriber unit of claim 40 wherein the multi-channel response measurement unit/detector is implemented in one of:
A) an application-specific integrated circuit;

B) a digital signal processor;

C) a processor;

D) code; and

E) a combination of at least two of A–D.

49. A subscriber unit having a synchronous coherent orthogonal frequency division multiplexing, SC-OFDM, receiver unit having a plurality of diversity antennas arranged to receive a plurality of composite SC-OFDM signals demodulated and parsed into a plurality of composite SC-OFDM symbols and a plurality of composite SC-OFDM pilot codes, the SC-OFDM receiver unit comprising:

A) a plurality of multi-channel channel response measurement units, each arranged to receive at least one composite SC-OFDM pilot code, for computing channel response measurements for a plurality of components for each of the plurality of composite SC-OFDM signals based on a plurality of associated pilot codes, and B) a diversity detector, coupled to the plurality of multi-channel channel response measurement units and to receive at least two of the plurality of composite SC-OFDM symbols, for detecting at least one symbol component from the composite SC-OFDM symbols based on the channel response measurements and the composite SC-OFDM symbols.

50. The subscriber unit of claim 49 wherein the diversity detector provides the at least one symbol component as a soft decision.

51. The subscriber unit of claim 49 wherein the diversity detector uses:

the channel response measurements; and the composite SC-OFDM symbols to form at least one weighted sum of the at least two of the plurality of composite SC-OFDM symbols in accordance with a minimum mean squared error combining scheme and then detects the at least one symbol component based on the at least one weighted sum.

52. The subscriber unit of claim 51 wherein the minimum mean squared error combining scheme calls for the computation of a signal covariance matrix and steering vector based on at least one of:

the channel response measurements; and the composite SC-OFDM symbols.

53. The subscriber unit of claim 49 wherein the diversity detector uses the channel response measurements and the composite SC-OFDM symbols to form at least one weighted sum of the at least two of the plurality of composite SC-OFDM symbols in accordance with a diversity with signal quality weighting combining scheme and then detects the at least one symbol component from the at least one weighted sum.

54. The subscriber unit of claim 49 wherein the diversity detector uses the channel response measurements and the composite SC-OFDM symbols to form at least one weighted sum of the at least two of the plurality of composite SC-OFDM symbols in accordance with a maximal ratio combining scheme and then detects the at least one symbol component from the at least one weighted sum.

55. The subscriber unit of claim 49 wherein at least two composite SC-OFDM pilot codes are received on each diversity antenna and each of the plurality of multi-channel channel response measurement units further compute filtered channel response measurements for at least one component of each of the composite SC-OFDM signals by interpolation filtering the channel response measurements for the at least one component of each of the composite SC-OFDM signals according to a predetermined interpolation filtering scheme.

56. The subscriber unit of claim 49 wherein the detector jointly detects a plurality of symbol components from the at least two composite SC-OFDM symbols in accordance with a predetermined joint detection scheme.

57. The subscriber unit of claim 49 wherein the multi-channel channel response measurement units/diversity detector is implemented in one of:

A) an application-specific integrated circuit;

B) a digital signal processor;

C) a processor;

D) code; and

E) a combination of at least two of A–D.

58. A method for implementing synchronous coherent orthogonal frequency division multiplexing utilizing a plurality of SC-OFDM transmitters and a plurality of SC-OFDM receivers, comprising the steps of:

A) utilizing the plurality of SC-OFDM transmitters, wherein each SC-OFDM transmitter is synchronized to a reference where the reference is derived from a common source, for transmitting SC-OFDM signals, wherein the SC-OFDM signals each have a cyclic extension, and the SC-OFDM signals include at least one pilot code in accordance with a predetermined pilot code scheme; and B) utilizing the plurality of SC-OFDM receivers, arranged for receiving the SC-OFDM signals from at least one of the plurality of SC-OFDM transmitters, for detecting information transmitted by at least one of the plurality of the SC-OFDM transmitters.

59. The method of claim 58 wherein the cyclic extension has a duration based at least in part on inter-SC-OFDM transmitter propagation delay.

60. The method of claim 58 wherein the cyclic extension is further based on a duration of a channel impulse response.

61. The method of claim 58 where the common source is one of:

A) a global positioning system; and

B) a wireline network clock.

62. The method of claim 58 wherein the reference derived from the common source is based on a closed loop timing adjustment scheme.

63. The method of claim 58 wherein the steps are implemented in one of:

A) an application-specific integrated circuit;

B) a digital signal processor;

C) a processor;

D) code; and

E) a combination of at least two of A–D.

64. A method for implementing synchronous coherent orthogonal frequency division multiplexing transmission utilizing a plurality of OFDM transmitters, comprising the steps of:

A) synchronizing transmission times of OFDM signals for each of the plurality of OFDM transmitters;

B) transmitting pilot codes and data from each of the plurality of OFDM transmitters according to a predetermined pilot code scheme where the pilot codes are transmitted on a same plurality of predetermined subcarriers for each OFDM transmitter.

65. The method of claim 64 wherein the steps are implemented in one of:

A) an application-specific integrated circuit;

B) a digital signal processor;
C) a processor;
D) code; and
E) a combination of at least two of A–D.

66. A method for implementing synchronous coherent orthogonal frequency division multiplexing reception utilizing an OFDM receiver arranged to receive SC-OFDM signals, comprising the steps of:
   A) demodulating and parsing the SC-OFDM signals into received pilot codes and received symbols;
   B) measuring a channel response based on at least one of the received pilot codes and a stored pilot code;
   C) recovering an estimate of transmitted information in the SC-OFDM signals based on a channel response measurement and the received symbols.

67. The method of claim 6 wherein the steps are implemented in one of:
   A) an application-specific integrated circuit;
   B) a digital signal processor;
   C) a processor;
   D) code;
   E) a combination of at least two of A–D.

68. A method for providing efficient orthogonal frequency division multiplexing reception upon receiving at least one orthogonal frequency division multiplexing signal, where a receiver uses at least frequency demultiplexed signals from a plurality of subcarriers to provide a detected signal, the method comprising the steps of:
   A) measuring an average adjacent-subcarriers phase difference based on at least frequency demultiplexed signals from a plurality of subcarriers to provide a measured adjacent-subcarriers phase difference; and
   B) compensating for the measured average adjacent-subcarriers phase difference in the formation of the detected signal.

69. The method system of claim 68 wherein the steps are implemented in one of:
   A) an application-specific integrated circuit;
   B) a digital signal processor;
   C) a processor;
   D) code; and
   E) a combination of at least two of A–D.

70. An orthogonal frequency division multiplexing OFDM receiver for receiving at least one orthogonal frequency division multiplexing signal, frequency demultiplexing the signal into a plurality of demultiplexed signals from a plurality of subcarriers, and for detecting at least one symbol from the demultiplexed signals, comprising:
   A) an adjacent-subcarriers phase difference measurement unit, coupled to receive the demultiplexed signals, for measuring an average adjacent-subcarriers phase difference, to provide a measured average adjacent-subcarriers phase difference;
   B) an adjacent-subcarriers phase difference compensation unit, coupled to the adjacent-subcarriers phase difference measurement unit and the demultiplexed signals, for compensating the demultiplexed signals for the measured average adjacent-subcarriers phase difference to provide compensated signals; and
   C) detector, coupled to the adjacent-subcarriers phase difference compensation unit, for detecting at least one symbol to provide at least one detected symbol, based on at least the compensated signals.

71. The OFDM receiver of claim 70 wherein the adjacent-subcarriers phase difference measurement unit/adjacent-subcarriers phase difference compensation unit/detector are implemented in one of:
   A) an application-specific integrated circuit;
   B) a digital signal processor;
   C) a processor;
   D) code; and
   E) a combination of at least two of A–D.

72. An orthogonal frequency division multiplexing receiver for receiving at least one orthogonal frequency division multiplexing signal, frequency demultiplexing the signal into a plurality of demultiplexed signals from a plurality of subcarriers, and for detecting at least one symbol from the demultiplexed signals, comprising:
   A) an adjacent-subcarriers phase difference measurement unit, coupled to receive the demultiplexed signals, for measuring an average adjacent-subcarriers phase difference to provide a measured average adjacent-subcarriers phase difference; and
   B) a detector with phase compensation unit, coupled to the adjacent-subcarriers phase difference measurement unit and the demultiplexed signals, for providing at least one detected symbol based on at least the demultiplexed signals and the measured adjacent-subcarriers phase difference.

73. The OFDM receiver of claim 72 wherein the adjacent-subcarriers phase difference measurement unit/detector with phase compensation unit are implemented in one of:
   A) an application-specific integrated circuit;
   B) a digital signal processor;
   C) a processor;
   D) code; and
   E) a combination of at least two of A–D.

74. A synchronous coherent orthogonal frequency division multiplexing, SC-OFDM, receiver for receiving at least one composite SC-OFDM signal, frequency demultiplexing the composite SC-OFDM signal into a plurality of composite SC-OFDM symbols from a plurality of subcarriers, and for detecting at least one symbol component from at least one composite SC-OFDM symbol, comprising:
   A) an adjacent-subcarriers phase difference measurement unit, coupled to receive the composite synchronous coherent orthogonal frequency division multiplexing symbols, for measuring an average adjacent-subcarriers phase difference, to provide a measured average adjacent-subcarriers phase difference;
   B) an adjacent-subcarriers phase difference compensation unit, coupled to the adjacent-subcarriers phase difference measurement unit and the composite SC-OFDM symbols, for compensating the composite SC-OFDM symbols for the measured average adjacent-subcarriers phase difference to provide compensated composite SC-OFDM symbols; and
   C) a detector, coupled to the adjacent-subcarriers phase difference compensation unit, for detecting at least one symbol component of at least one composite SC-OFDM symbol to provide at least one detected symbol component based on at least the compensated composite SC-OFDM symbols.

75. The SC-OFDM receiver of claim 74 wherein the adjacent-subcarriers phase difference measurement unit/adjacent-subcarriers phase difference compensation unit/detector are implemented in one of:

A) an application-specific integrated circuit;

B) a digital signal processor;

C) a processor;

D) code; and

E) a combination of at least two of A–D.

76. A synchronous coherent orthogonal frequency division multiplexing, SC-OFDM, receiver for receiving at least one composite SC-OFDM signal, frequency demultiplexing the composite SC-OFDM signal into a plurality of composite SC-OFDM symbols from a plurality of subcarriers, and for detecting at least one symbol component from at least one composite SC-OFDM symbol, comprising:

A) a multichannel adjacent-subcarriers phase difference measurement unit, coupled to receive the composite SC-OFDM symbols, for measuring an average adjacent-subcarriers phase difference for a plurality of components of the composite SC-OFDM symbols, to provide a plurality of measured average adjacent-subcarriers phase differences; and B) a detector with multi-channel adjacent-subcarriers phase difference compensation unit, coupled to the multichannel adjacent-subcarriers phase difference measurement unit and the composite SC-OFDM symbols, for detecting at least one symbol component of at least one composite SC-OFDM symbol to provide at least one detected symbol component based on at least the compensated composite SC-OFDM symbols and the plurality of measured average adjacent-subcarriers phase differences.

77. The SC-OFDM receiver of claim 76 wherein the multichannel adjacent-subcarriers phase difference measurement unit/detector with multi-channel adjacent-subcarriers phase difference compensation unit are implemented in one of:

A) an application-specific integrated circuit;

B) a digital signal processor;

C) a processor;

D) code; and

E) a combination of at least two of A–D.

* * * * *